US009006380B2

(12) United States Patent
Weaver et al.

(10) Patent No.: US 9,006,380 B2
(45) Date of Patent: Apr. 14, 2015

(54) THERMOFORMING, SCRATCH-RESISTANT, LOW GLOSS COMPOSITIONS COMPRISING INTERPOLYMERS OF ETHYLENE/α-OLEFINS

(75) Inventors: Laura B. Weaver, Lake Jackson, TX (US); Douglas P. Waszeciak, Lake Jackson, TX (US); Eddy I. Garcia-Meitin, Angleton, TX (US); Lisa C. Kohlenberg, Lake Jackson, TX (US); Pankaj Gupta, Midland, MI (US); Theresa J. Hermel-Davidock, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 903 days.

(21) Appl. No.: 12/596,809

(22) PCT Filed: Apr. 2, 2008

(86) PCT No.: PCT/US2008/059149
§ 371 (c)(1),
(2), (4) Date: Dec. 31, 2009

(87) PCT Pub. No.: WO2008/134186
PCT Pub. Date: Nov. 6, 2008

(65) Prior Publication Data
US 2010/0152361 A1 Jun. 17, 2010

Related U.S. Application Data

(60) Provisional application No. 60/913,760, filed on Apr. 24, 2007.

(51) Int. Cl.
*C08F 210/02* (2006.01)
*C08L 23/08* (2006.01)
*C08F 295/00* (2006.01)
*C08F 297/08* (2006.01)
*C08L 53/00* (2006.01)
*C08F 210/06* (2006.01)
*C08F 210/08* (2006.01)
*C08F 210/14* (2006.01)
*C08L 83/06* (2006.01)
*C08L 23/14* (2006.01)
*C08F 210/16* (2006.01)
*C08L 23/10* (2006.01)

(52) U.S. Cl.
CPC ......... *C08L 23/0815* (2013.01); *C08L 2203/30* (2013.01); *C08L 2205/03* (2013.01); *C08F 210/02* (2013.01); *C08F 210/06* (2013.01); *C08F 210/08* (2013.01); *C08F 210/14* (2013.01); *C08L 83/06* (2013.01); *C08L 23/142* (2013.01); *C08F 210/16* (2013.01); *C08F 295/00* (2013.01); *C08F 297/08* (2013.01); *C08F 297/083* (2013.01); *C08L 23/10* (2013.01); *C08L 53/00* (2013.01)

(58) Field of Classification Search
CPC .... C08F 210/02; C08F 210/06; C08F 210/08; C08F 210/14; C08F 210/16; C08F 295/00; C08F 297/08; C08F 297/083; C08L 23/0815; C08L 23/142; C08L 53/00; C08L 83/06; C08L 2203/30; C08L 2205/03
See application file for complete search history.

(56) References Cited

U.S. PATENT DOCUMENTS

| | | | |
|---|---|---|---|
| 4,762,890 A | 8/1988 | Strait et al. | |
| 4,927,888 A | 5/1990 | Strait et al. | |
| 4,950,541 A | 8/1990 | Tabor et al. | |
| 6,008,294 A * | 12/1999 | Bonekamp et al. | ............. 525/98 |
| 6,030,917 A | 2/2000 | Weinberg et al. | |
| 6,103,803 A | 8/2000 | Cheung et al. | |
| 6,248,540 B1 | 6/2001 | Weinberg et al. | |
| 6,268,444 B1 | 7/2001 | Klosin et al. | |
| 6,306,658 B1 | 10/2001 | Turner et al. | |
| 6,316,663 B1 | 11/2001 | Guram et al. | |
| 6,362,309 B1 | 3/2002 | Lund et al. | |
| 6,599,985 B2 | 7/2003 | Fujii et al. | |
| 6,667,351 B2 | 12/2003 | Langohr et al. | |
| 6,803,014 B2 | 10/2004 | Ho et al. | |
| 6,875,826 B1 | 4/2005 | Huovinen et al. | |
| 6,953,764 B2 | 10/2005 | Frazier et al. | |
| 7,608,668 B2 | 10/2009 | Shan et al. | |
| 2003/0004286 A1 | 1/2003 | Klosin et al. | |
| 2003/0204017 A1 | 10/2003 | Stevens et al. | |

(Continued)

FOREIGN PATENT DOCUMENTS

| | | |
|---|---|---|
| WO | WO 03/040195 | 5/2003 |
| WO | WO 2004/024740 | 3/2004 |

(Continued)

OTHER PUBLICATIONS

Definition of siloxanes. IUPAC. Compendium of Chemical Terminology, 2nd ed. Compiled by A. D. McNaught and A. Wilkinson. Blackwell Scientific Publications, Oxford (1997).*

(Continued)

*Primary Examiner* — Richard A Huhn
(74) *Attorney, Agent, or Firm* — Whyte Hirschboeck Dudek S.C.

(57) ABSTRACT

This invention relates to polymer compositions comprising at least one ethylene/α-olefin interpolymer and a branched and/or high melt strength polypropylene, methods of making the polymer compositions, and molded, overmolded, extruded into profiles or thermoformed products made from the polymer compositions. The polymer compositions may have reduced post-thermoformed sheet and post extruded (profile) gloss properties and/or improved scratch-resistant properties.

19 Claims, 13 Drawing Sheets

(56) References Cited

U.S. PATENT DOCUMENTS

| | | | |
|---|---|---|---|
| 2004/0010103 A1 | 1/2004 | Boussie et al. | |
| 2006/0189759 A1* | 8/2006 | Walther et al. | 525/192 |
| 2006/0199908 A1* | 9/2006 | Cheung et al. | 525/191 |
| 2006/0211819 A1* | 9/2006 | Hoenig et al. | 525/88 |

FOREIGN PATENT DOCUMENTS

| | | |
|---|---|---|
| WO | WO 2005/090425 | 9/2005 |
| WO | WO 2005/090426 | 9/2005 |
| WO | WO2005/090427 A1 | 9/2005 |
| WO | 2006/102154 A2 | 9/2006 |
| WO | WO 2006/101999 | 9/2006 |
| WO | WO 2006/102154 | 9/2006 |

OTHER PUBLICATIONS

Lau, H. C., Bhattacharya, S. N., Field, G. J., "Melt strength of polypropylene: Its relevance to thermoforming", Polymer Engineering and Science 1998, 38(1), 1915-1923.*
Nielsen, L. E., Landel, R. F. Mechanical Properties of Polymers and Composites, 2 ed.; Marcel Dekker, 1994; pp. 167-168.*
Chinese Office Action issued Jul. 29, 2011 for Chinese Patent Application No. 200880019322, including translation thereof.
Rauwendaal, "Polymer Extrusion", Hanser Publishers, New York, NY, (1986), pp. 322-334.
Graebling, "Synthesis of Branched Polypropylene by a Reactive Extrusion Process," 35(12) Macromolecules, (2002), pp. 4602-4610.
Langston et al., "One-pot process of preparing long chain branched polypropylene using C[2]-symmetric metallocene . . . " 38(14) Macromolecules (2005), pp. 5849-5853.
Deslauriers, "Quantifying short chain branching microstructures in ethylene-1-olefin copolymers using . . . ", 43 Polymer (2002), pp. 159-170.
Wypych, "Handbook of Plasticizers," ChemTec Publishing, Toronto-Scarborough, Ontario (2004).
Beall, "Rotational Molding : Design, Materials & Processing," Hanser/Gardner Publications, Cincinnati, Ohio (1998).
Elias, "An Introduction to Plastics," 2d Edition, Wiley-VCH, Weinhei, Germany (2003), pp. 161-165.
Throne, "Understanding Thermoforming," Hanser Gardner Publications, Inc., Cincinnati OH (999).
Wong et al., "A new test methodology for evaluating scratch resistance of polymers", 256 Wear, (2004), pp. 1214-1227.
Stevens, "Extruder Principals and Operation," Elsevier Applied Science Publishers, New York, NY (1985).
Throne, "Technology of Thermoforming," Hanser Verlag, Munich (1996).
Markovich et al., "Development of gel-permeation chromatography-Fourier transform infrared . . . ", 65 Polymeric Materials Science and Engineering (1991), pp. 98-100.
Lee, "Understanding Blow Molding," Hanser Gardner Publications, Cincinnati, Ohio (2000).
Randall, "A Review of High Resolution Liquid 13Carbon Nuclear . . . ", JMS-Rev. Macromol. Chem. Phys., C29 (1989), pp. 201-317.
Beaumont et al., "Successful Injection Molding: Process, Design, and Simulation," Hanser Gardner Publications, Cincinnati, Ohio (2002).
Wild, et al., "Determination of Branching Distributions in Polyethylene and Ethylene Copolymers", 20 J. Polym. Sci., (1982), pp. 441-455.
Williams et al., "The Construction of a Polyethylene Calibration Curve . . . ", 6 J. Polym. Sci., Polym. Let., (1968), pp. 621-624.
Zweifel et al., "Plastics Additives Handbook," Hanser Gardner Publications, Cincinnati, Ohio, 5th edition (2001), pp. 1-426, 511-552, 627-646, 725-882, 901-948.
U.S. Appl. No. 60/662,937, filed Mar. 17, 2005.
U.S. Appl. No. 60/662,938, filed Mar. 17, 2005.
U.S. Appl. No. 60/662,939, filed Mar. 17, 2005.

* cited by examiner

Reflected Nomarski of Plaque Surfaces Before and After Heat Treatment

TEM images of Skin Morphologies Before and After Heat Treatment

*Reflected Nomarski Images of Exterior Surfaces of Extruded Profiles*

THERMOFORMING, SCRATCH-RESISTANT, LOW GLOSS COMPOSITIONS COMPRISING INTERPOLYMERS OF ETHYLENE/α-OLEFINS

FIELD OF THE INVENTION

This invention relates to polymer compositions comprising at least one ethylene/α-olefin interpolymer and a branched and/or high melt strength polypropylene, methods of making the polymer compositions, and molded, extruded into profiles, or thermoformed products made from the polymer compositions. The polymer compositions may have reduced post-thermoformed sheet and post extruded gloss properties and/or improved scratch resistant properties.

BACKGROUND AND SUMMARY OF THE INVENTION

Every year approximately 20 million pounds of extruded or calendared sheets are used to make automotive interior parts such as door panels and instrument panels in North America alone. Generally, the interior parts can be prepared from the extruded sheets by various known plastic processes such as thermoforming. Currently, most of the extruded sheets are made of flexible polyvinylchloride (f-PVC) and thermoplastic polyolefin (TPO) and the f-PVC and TPO sheets are generally top-coated with polyurethane (PU) coatings to keep the gloss of the post-thermoformed parts low (e.g., <about 6% at 60 degree) for consumer safety reason and to increase scratch resistance. In general, the use of PU coatings is not desirable because of their high volatile organic compound (VOC) emissions, and interference with grain pattern replication in the f-PVC and TPO sheets. Therefore, suppliers of automotive parts are always looking for alternative materials with low gloss. Attempts to use alternative polymer compositions such as blends of elastomers and polyolefins such as polypropylene are often not satisfactory because the gloss of the extruded sheets is generally high and the scratch resistance is generally low.

Every year approximately 30 million pounds of extruded profiles using low gloss thermoplastic vulcanizates and over 700 million pounds flexible profiles are produced using high gloss polyvinyl chloride (PVC). There is a desire for suppliers to keep low gloss and use lower cost alternatives. Attempts to use alternative polymer compositions such as blends of elastomers and polyolefins such as polypropylene are often not satisfactory because the gloss of the extruded profile is generally high and the scratch resistance is generally low.

Therefore, there is a need for novel polymer compositions that are thermoformable and/or extrudable into shaped profiles and can meet the gloss and scratch resistance requirements for various applications such as interior parts for transportation industries such as the automotive industry. Specifically, there is a need for extruded sheets that (1) can be thermoformed into automotive interior parts that have a desirable gloss of less than 6%; (2) are substantially free of defects such as webbing, ripping, tearing, pin holes and the like; (3) exhibit improved scratch resistance; and (4) do not require PU coatings for gloss control. Further, there is a need for automotive interior parts made from novel polymer compositions that are thermoformable and possesses the desirable gloss properties.

The aforementioned needs are met by various aspects of the inventions. In one aspect, the invention relates to a polymer composition comprising at least one ethylene/α-olefin interpolymer and a polypropylene. In one embodiment, the polypropylene is a branched or high melt strength polypropylene. In another embodiment, the polypropylene has a melt flow rate of at least about 2, preferably at least about 2.5 g/10 minutes measured with a 2.16 Kg load at 230° C. according to ASTM 1238. In another embodiment, a polypropylene, preferably branched, has a tan delta value at 0.1 radians per second of less than about 2.5, preferably less than about 1.5, more preferably less than about 1.0.

In another embodiment, the ethylene/α-olefin interpolymer has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq -2002.9 + 4538.5(d) - 2422.2(d)^2.$$

In another embodiment, the ethylene/α-olefin interpolymer has a $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

In another embodiment, the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d).$$

In another embodiment, the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

In another embodiment, the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

In another embodiment, the ethylene/α-olefin interpolymer has at least one molecular fraction which elutes between 40° C. and 130° C. when fractionated using TREF, characterized in that the fraction has a block index of at least 0.5 and up to about 1 and a molecular weight distribution, $M_w/M_n$, greater than about 1.3.

In another embodiment, the ethylene/α-olefin interpolymer has an average block index greater than zero and up to about 1.0 and a molecular weight distribution, $M_w/M_n$, greater than about 1.3.

In another embodiment, the α-olefin in the ethylene/α-olefin interpolymer is styrene, propylene, 1-butene, 1-hexene, 1-octene, 4-methyl-1-pentene, norbornene, 1-decene, 1,5-hexadiene, or a combination thereof.

The ethylene/α-olefin interpolymer characteristics above are given with respect to the ethylene/α-olefin interpolymer before any significant crosslinking, i.e., before crosslinking. The ethylene/α-olefin interpolymers useful in the present invention may or may not be crosslinked to a degree to obtain the desired properties. By using the characteristics above as measured before crosslinking is not meant to suggest that the interpolymer is or is not required to be crosslinked—only that the characteristic is measured with respect to the interpolymer without significant crosslinking. Crosslinking may or may not change each of these properties depending upon the specific polymer and degree of crosslinking.

In another aspect, the invention relates to articles such as thermoformed articles comprising the polymer composition disclosed herein. In one embodiment, the thermoformed article is an article for the transportation industry such as an interior or an exterior part for a automotive vehicle. In another embodiment, the 60 degree gloss of the surface of the thermoformed article is less than about 9.0%. In another embodiment, there is no visible scratch whitening on the surface of the thermoformed article after tested for its scratch resistance according to ASTM D7027-05 at a load equal to or less than 20 N and a scratch speed of 50 mm/s.

In another embodiment, the polymer composition or thermoformed article further comprises at least one additive, wherein the additive is selected from the group consisting of mold release agents such as a polysiloxane, a colorant or pigment, plasticizer, an oil, an antioxidant, a UV stabilizer, a filler, a lubricant, an antifogging agent, a flow aid, a coupling agent, a cross-linking agent, a nucleating agent, a surfactant, a solvent, a flame retardant, an antistatic agent, an antimicrobial, a scratch or mar resistance agent, or a combination thereof.

Additional aspects of the invention and characteristics and properties of various embodiments of the invention become apparent with the following description.

DETAILED DESCRIPTION OF THE INVENTION

General Definitions

Figure 1:
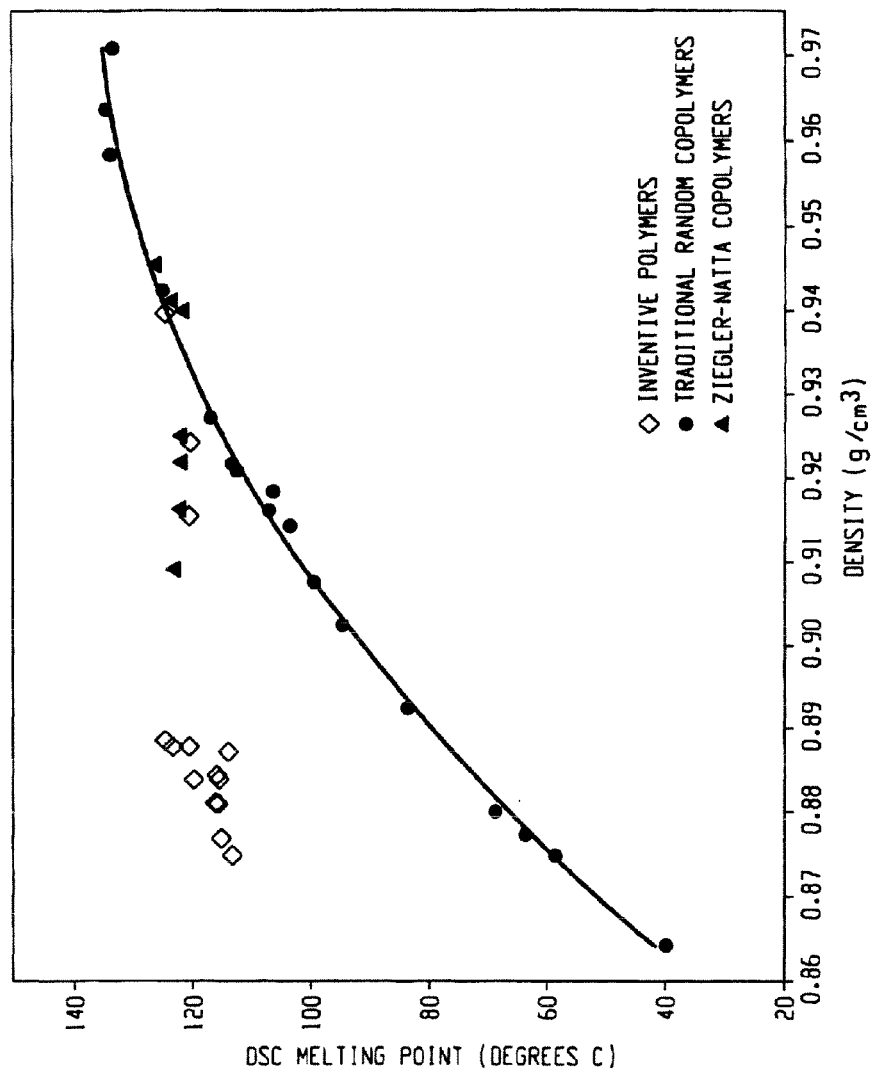
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably, ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The term "composition," as used herein, includes a mixture of materials which comprise the composition, as well as reaction products and decomposition products formed from the materials of the composition.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments the multi-block copolymer can be represented the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376, 835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2,9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit. $R^L$, is disclosed, any number falling within the range is specifically disclosed. In particular, the following numbers within the range are specifically disclosed: $R=R^L-k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Embodiments of the invention provide a method for reducing the blocking and/or re-blocking tendency of some polymer particles, such as polyolefin pellets, and some polymer articles, such as polyolefin films. The anti-blocking polymer compositions comprise an ethylene/α-olefin interpolymer disclosed herein and an amide-based blocking agent. The ethylene/α-olefin interpolymers disclosed herein are a multi-block copolymer comprising at least one soft block and at least one hard block. The anti-blocking polymer composition may have a pellet blocking strength of equal to or less than about 100 lbs/ft² (4800 Pa). In some embodiments, the pellet blocking strength is equal to or less than about 50 lbs/ft² (2400 Pa), equal to or less than about 5 lbs/ft² (240 Pa), or about 0 lbs/ft² (0 Pa). When anti-blocking polymer composition is made into a film, the film may have a blocking force of less than about 100 grams, measured according to ASTM method D-3354. In some embodiments, the blocking force is less than about 80 grams, less than about 60 grams, less than about 50 grams, less than about 30 grams, less than about 20 grams, or less than about 10 grams. In other embodiments, the blocking force is less than about 5 grams or about zero gram.

Pellet blocking strength can be measured as follows: pellets (150 g) are loaded into a 2" (5 cm) diameter hollow cylinder that is made of two halves held together by a hose clamp. A 2.75 lb (1.25 kg) load is applied to the pellets in the cylinder at 45° C. for 3 days. After 3 days, the pellets loosely consolidate into a cylindrical shaped plug. The plug is removed from the form and the pellet blocking force measured by loading the cylinder of blocked pellets in compression using an Instron™ instrument to measure the compressive force needed to break the cylinder into pellets.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$T_m > -2002.9 + 4538.5(d) - 2422.2(d)^2$, and preferably $T_m \geq -6288.1 + 13141(d) - 6720.3(d)^2$, and more preferably $T_m \geq 858.91 - 1825.3(d) + 1112.8(d)^2$.

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
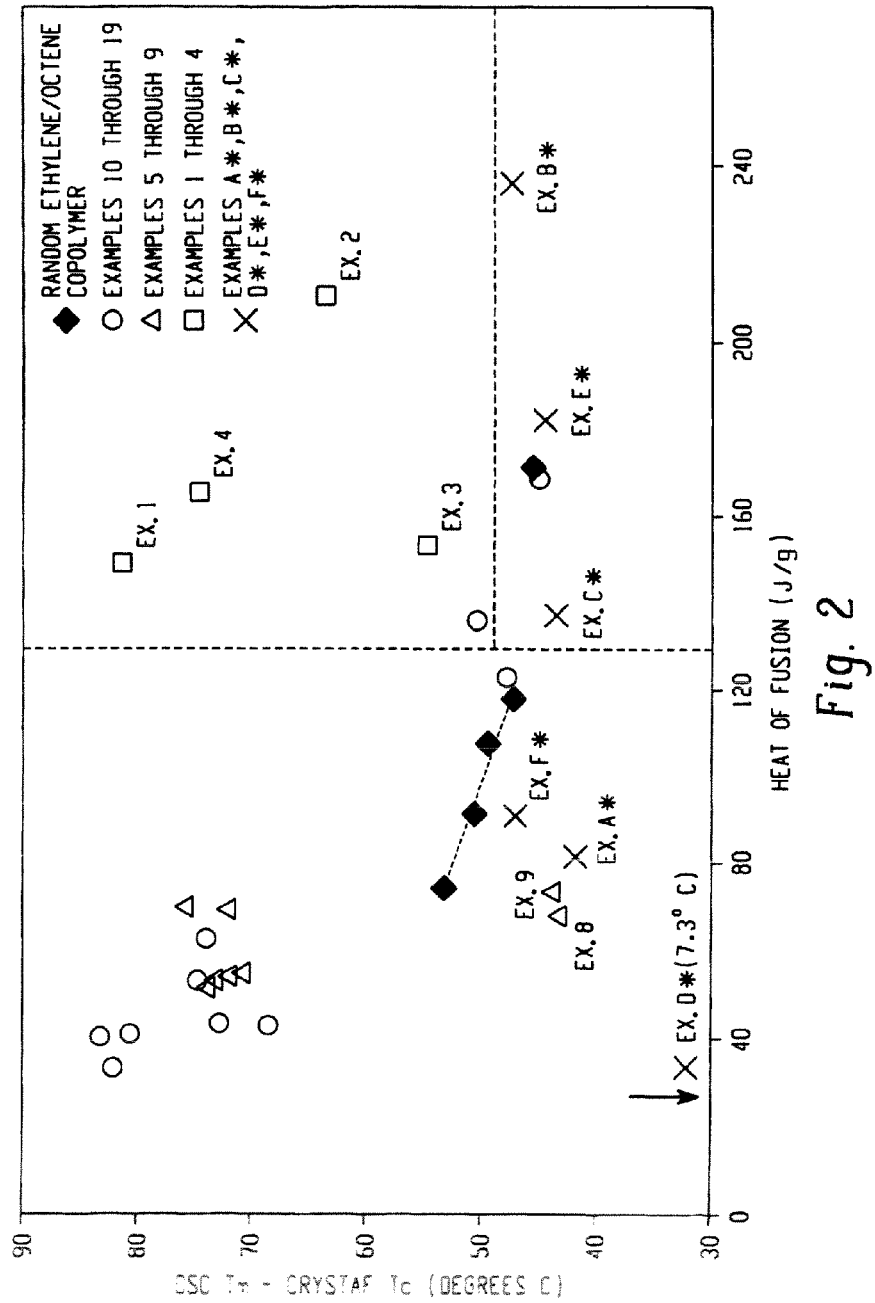
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer Examples 10-19. The "X" symbols represent polymer Comparative Examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$\Delta T > -0.1299(\Delta H) + 62.81$ and preferably $\Delta T \geq -0.1299(\Delta H) + 64.38$, and more preferably $\Delta T \geq -0.1299(\Delta H) + 65.95$, for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation $\Delta T = -0.1299(\Delta H) + 62.81$.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the $M_w/M$, of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; and preferably $Re \geq 1491 - 1629(d)$; and more preferably $Re \geq 1501 - 1629(d)$; and even more preferably $Re \geq 1511 - 1629(d)$.

Figure 3:
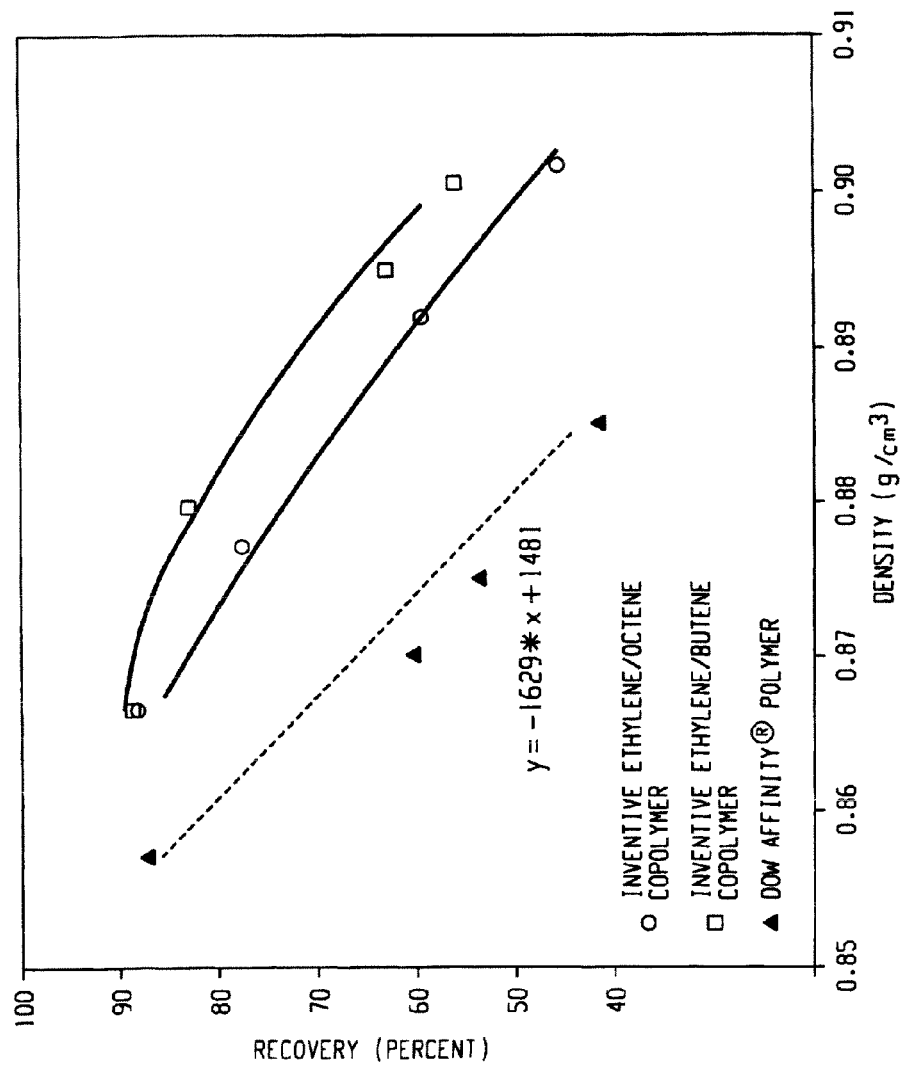
FIG. 3 shows the effect of density on elastic recovery for unoriented films made from inventive interpolymers (represented by the squares and circles) and traditional copolymers (represented by the triangles which are various AFFINITY® polymers (The Dow Chemical Company)). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≥11 MPa, more preferably a tensile strength ≥13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the $M_w/M_n$ of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013)T+20.07, more preferably greater than or equal to the quantity (−0.2013)T+21.07, where T is the numerical value of the peak elution temperature of the TREF fraction being compared, measured in ° C.

Figure 4:
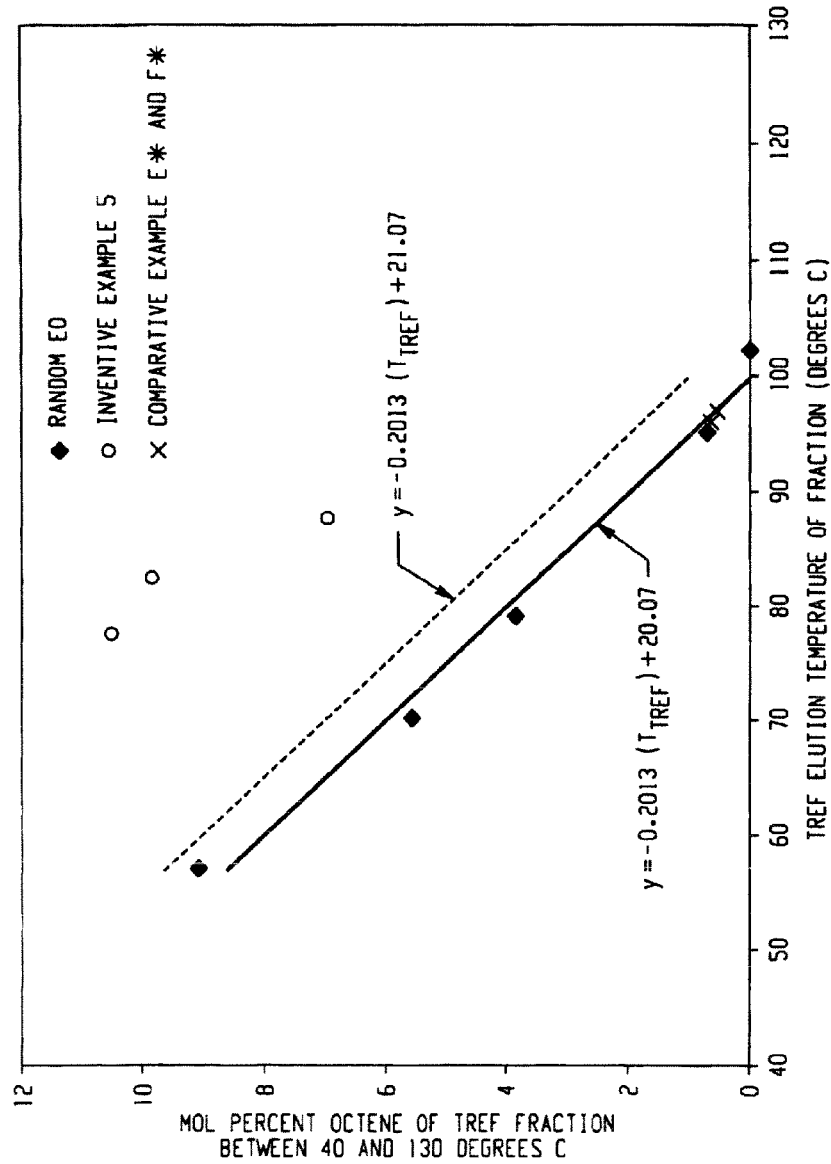
FIG. 4 is a plot of octene content of TREF fractionated ethylene/1-octene copolymer fractions versus TREF elution temperature of the fraction for the polymer of Example 5 (represented by the circles) and comparative polymer Comparative Examples E* and F* (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013)T+ 20.07 (solid line). The line for the equation (−0.2013)T+ 21.07 is depicted by a dotted line. Also depicted are the comonomer contents for fractions of several block ethylene/ 1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
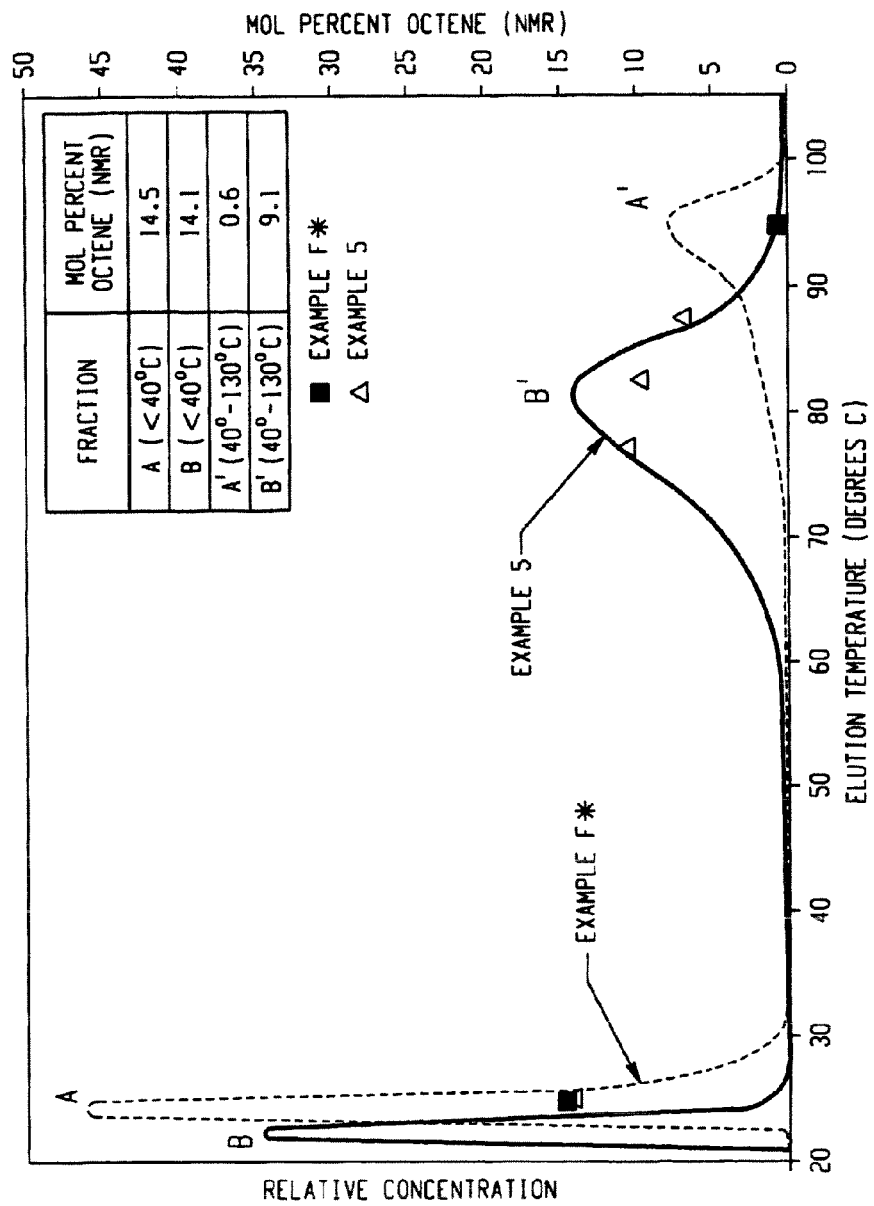
FIG. 5 is a plot of octene content of TREF fractionated ethylene/1-octene copolymer fractions versus TREF elution temperature of the fraction for the polymer of Example 5 (curve 1) and for polymer Comparative Examples F* (curve 2). The squares represent polymer Comparative Examples F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the $M_w/M_n$ of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity $(-0.1356)T+13.89$, more preferably greater than or equal to the quantity $(-0.1356)T+14.93$, and most preferably greater than or equal to the quantity $(-0.2013)T+21.07$, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity $(-0.2013)T+20.07$, more preferably greater than or equal to the quantity $(-0.2013)T+21.07$, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$T_m \geq (-5.5926)(\text{mol percent comonomer in the fraction})+135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius})-136.58.$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in Celsius})+22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$)

signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith. Linley; "Development of gel-permeation chromatography-Fourier transform infrared spectroscopy for characterization of ethylene-based polyolefin copolymers". Polymeric Materials Science and Engineering (1991), 65, 98-100; and Deslauriers, P. J.; Rohlfing. D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$LnP_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$LnP = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $LnP_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
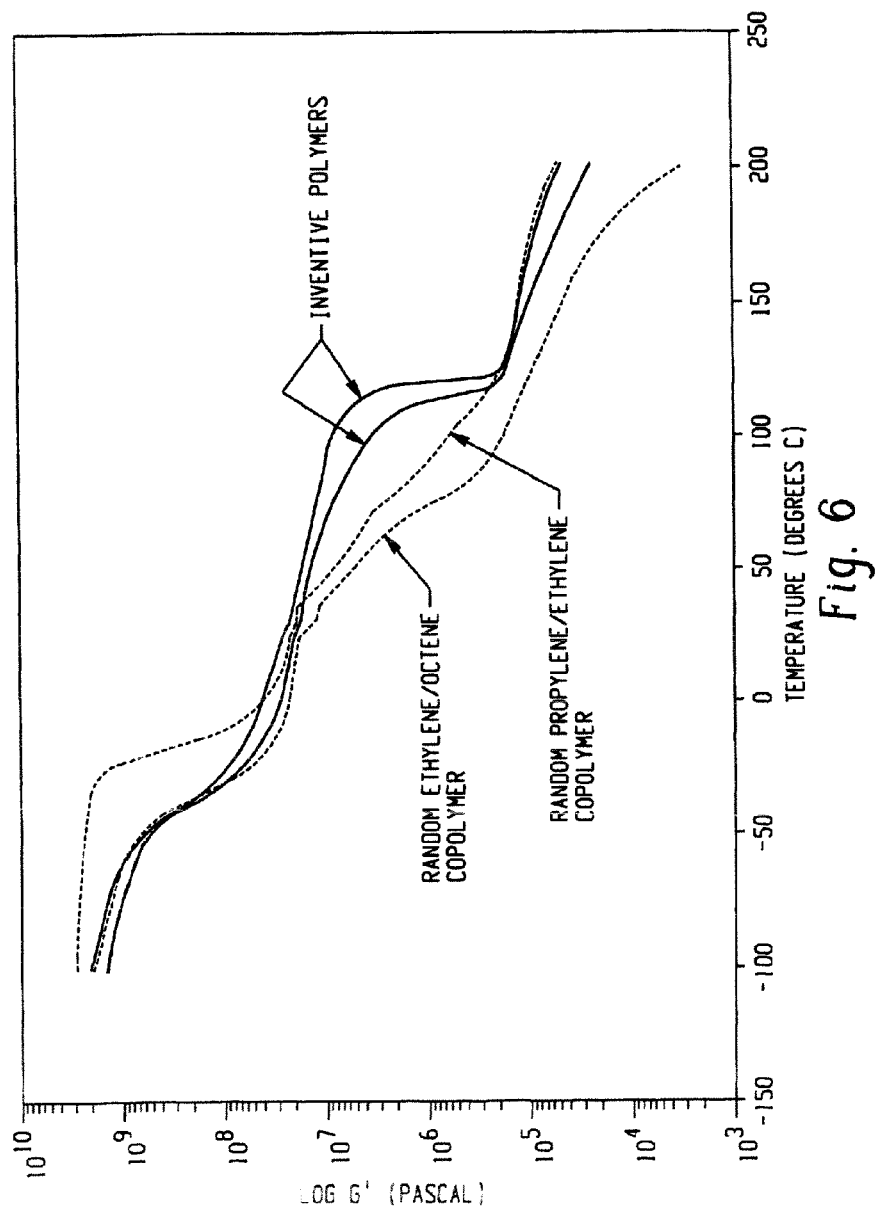
FIG. 6 is a graph of the log of storage modulus as a function of temperature for comparative ethylene/1-octene copolymer (curve 2) and propylene/ethylene copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log(G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
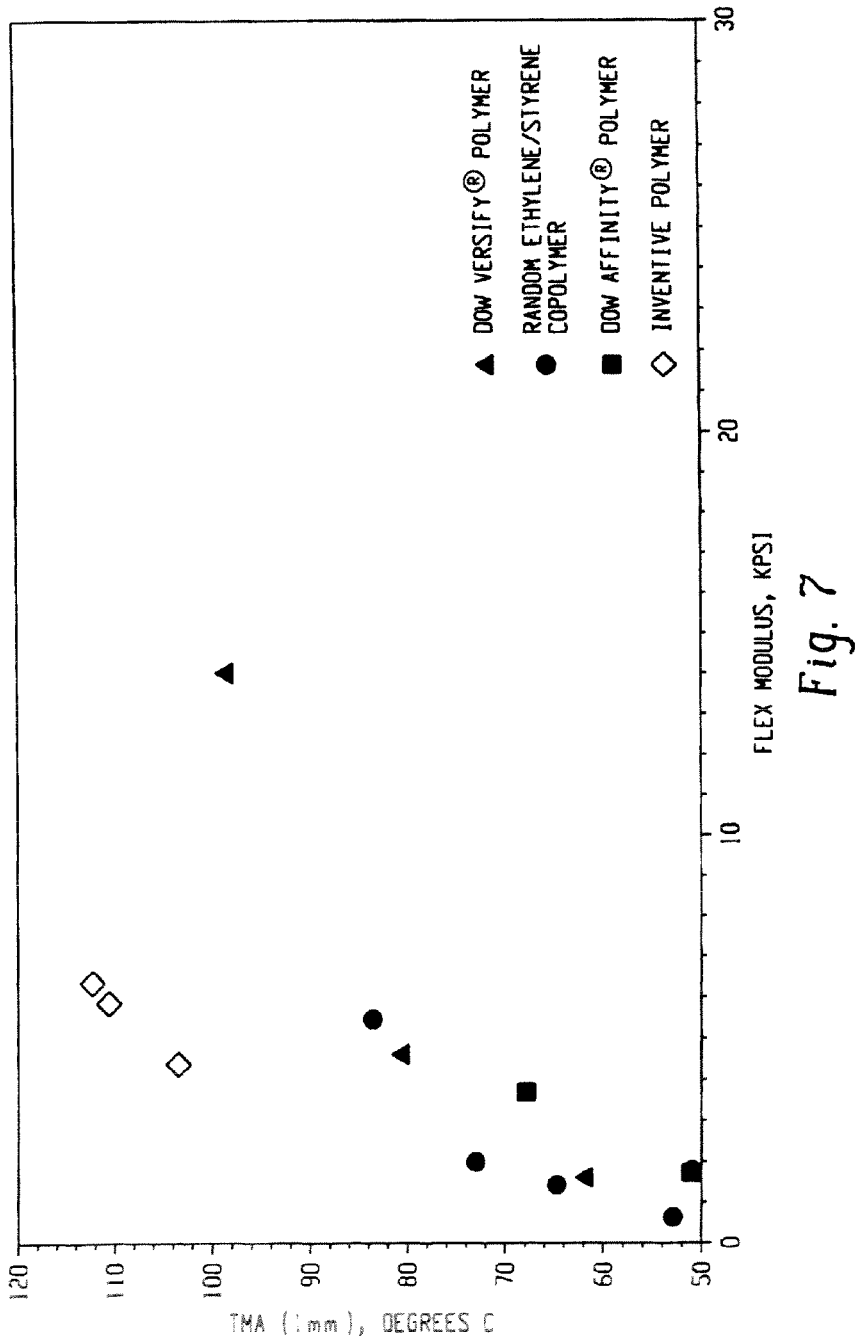
FIG. 7 shows a plot of TMA (1 mm) versus flex modulus for some inventive polymers (represented by the diamonds), as compared to some known polymers. The triangles represent various VERSIFY® polymers (The Dow Chemical Company); the circles represent various random ethylene/styrene copolymers; and the squares represent various AFFINITY® polymers (The Dow Chemical Company).
Figure 8A:
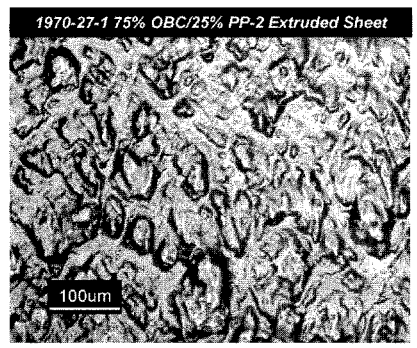
FIGS. 8A-D show the optical micrographs of the surface of the extruded and heat-treated sheets of Example 21 (FIGS. 8A and 8B respectively) and Comparative Example M (FIGS. 8C and 8D respectively), taken under reflected Nomarski interference contrast at 200× magnification.
Figure 8B:
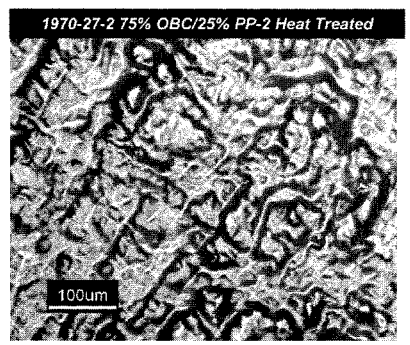
Figure 8C:
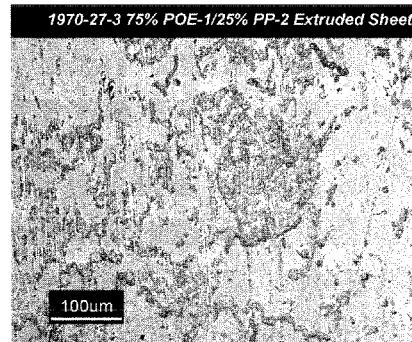
Figure 8D:
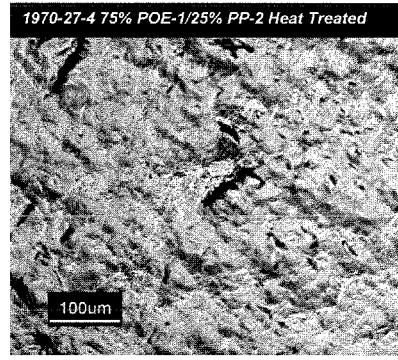

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000.000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/662,938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

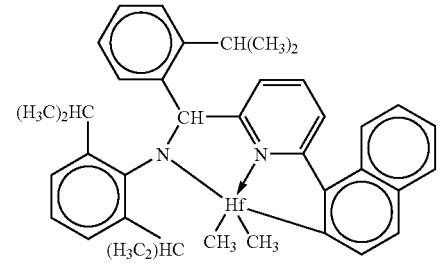

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

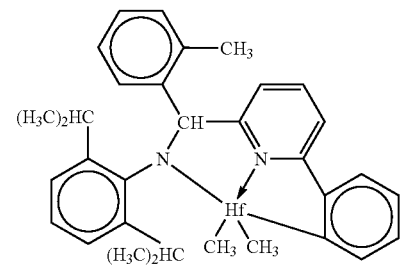

Catalyst (A3) is bis[N,N'''-(2,4,6-tri(methylphenyl)amido)ethylenediamine]hafnium dibenzyl.

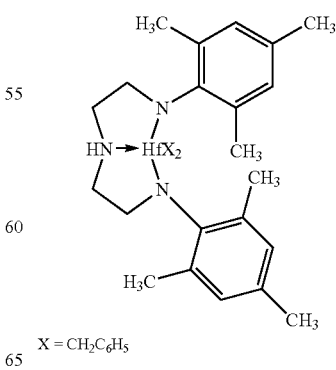

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

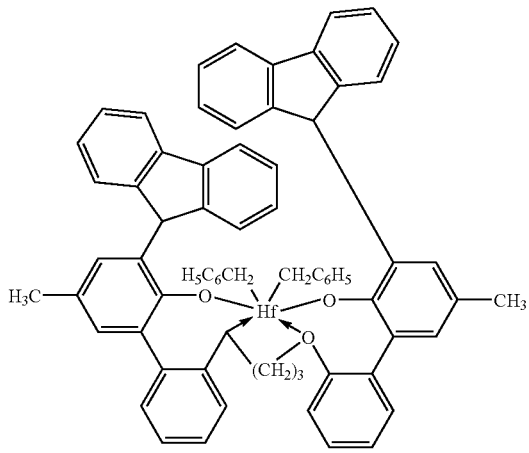

Catalyst (B1) is 1,2-bis-(3,5-di-t-butylphenylene)(1-(N-(1-methylethyl)immino)methyl)(2-oxoyl)zirconium dibenzyl

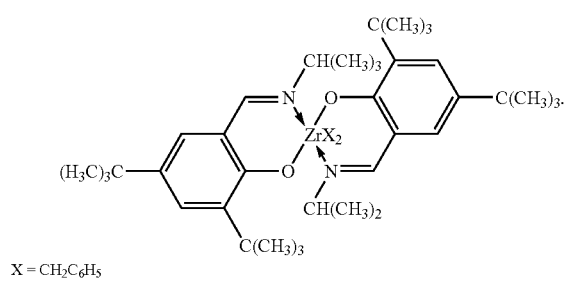

Catalyst (B2) is 1,2-bis-(3,5-di-t-butylphenylene)(1-(N-(2-methylcyclohexyl)-no)methyl)(2-oxoyl)zirconium dibenzyl

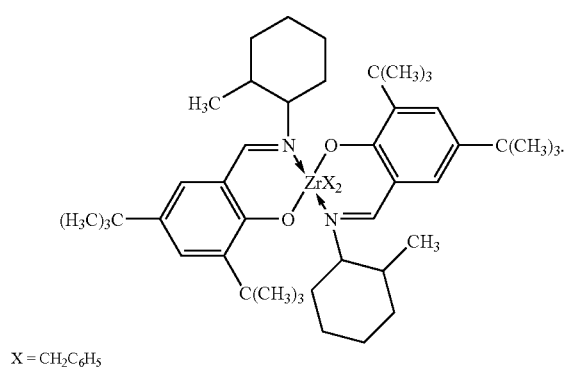

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

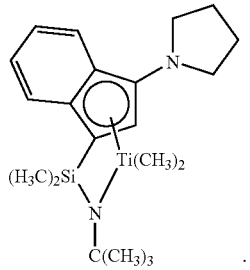

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

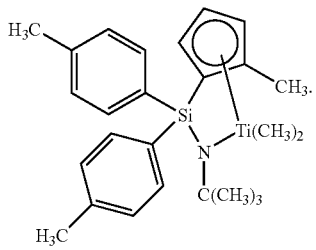

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

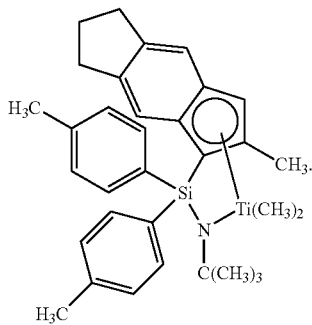

Catalyst (D1) is bis(dimethyldisiloxane)(indene-1-yl)zirconium dichloride available from Sigma-Aldrich:

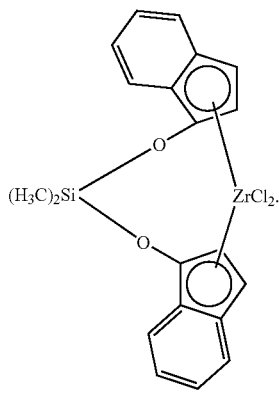

Shuttling Agents

The shuttling agents employed include diethylzinc, di(i-butyl)zinc, di(n-hexyl)zinc, triethylaluminum, trioctylaluminum, triethylgallium, i-butylaluminum bis(dimethyl(t-butyl) siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl) amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyeamide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-C20 α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like, 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The amount of the ethylene/α-olefin interpolymer in the polymer composition disclosed herein can be as much or as little to obtain the desired properties. For example, typical applications may call for from about 5 wt % to about 95 wt %, from about 10 wt % to about 95 wt %, from about 20% wt % to about 95%, from about 30 wt % to about 95 wt %, from about 40 wt % to about 95 wt %, from about 50 wt % to about 95 wt %, or from about 60 wt % to about 90 wt % of the total weight of the polymer composition. In some embodiments, the amount of the ethylene/α-olefin interpolymer in the polymer composition is from about 70 wt % to about 75 wt %, based on the total weight of the polymer composition.

Polypropylene

The polymer compositions comprise at least a polypropylene which may improve or modify properties, for example melt strength, of the polymer compositions. Any polypropylene known to a person of ordinary skill in the art may be used to prepare the polymer compositions disclosed herein. Non-limiting examples of polypropylene include random polypropylenes including low density polypropylene (LDPP), high density polypropylene (HDPP), high melt strength polypropylene (HMS-PP), high impact polypropylene (HIPP), isotactic polypropylene (iPP), syndiotactic polypropylene (sPP) and the like, and combinations thereof. In some embodiments, the polypropylene is a relatively high melt strength polypropylene. In other embodiments, the polypropylene is a branched polypropylene.

In further embodiments, the polypropylene has a melt flow rate, $I_2$, from about 0.01 to about 2000 g/10 minutes, from about 0.01 to about 1000 g/10 minutes, from about 0.01 to about 500 g/10 minutes, or from about 0.01 to about 100 g/10 minutes, measured with a 2.16 Kg load at 230° C. according to ASTM 1238. In certain embodiments, the polypropylene has a melt flow rate, $I_2$, from about 1 to about 100 g/10 minutes, from about 2 to about 75 g/10 minutes or from about 3 to about 50 g/10 minutes, measured with a 2.16 Kg load at 230° C. according to ASTM D 1238. In other embodiments, the melt flow rate. $I_2$, for the polypropylene is at least about 0.5 g/10 minutes, at least about 1 g/10 minutes, at least about 3 g/10 minutes, at least about 5 g/10 minutes, at least about 7.5 g/10 minutes, at least about 10 g/10 minutes, at least about 15 g/10 minutes, or at least about 20 g/10 minutes, measured with a 2.16 Kg load at 230° C. according to ASTM 1238.

In further embodiments, preferred branched polypropylenes often have a tan delta value at 0.1 radians per second of less than about 2.5, preferably less than about 1.5, more preferably less than about 1.0. As one skilled in the art will appreciate tan delta generally relates to the elasticity of a material as it is the ratio of the loss modulus to the storage modulus. Usually, the higher the storage modulus, the lower the tan delta and the more elastic the material. Of course, more elasticity may be related to higher molecular weight and higher branching. The tan delta measurements are usually done using an Advanced Rheometric Expansion System (ARES) instrument from Rheometric Scientific having 25 mm dia. Parallel plates with approx. a 0.002 inch gap in the oscillator shear mode with parallel plates at a 15% strain, a 2000 gram transducer and a nitrogen purge. Measurements are taken at 5 points per decade from 0.1 to 100 radians per second at 190° C. Other details are found in the section below entitled "DMA".

Some non-limiting examples of suitable HMS polypropylenes or branched polypropylenes include PROFAX® PF 814 available from Basell Polyolefins, Elkton, Md.; INSPIRE® HMS from The Dow Chemical Company, Midland, Mich.; and DAPLOY® WB260HMS and WB130HMS from Borealis, Kongens Lyngby, Denmark. Some suitable HMS polypropylenes or branched polypropylenes can also be obtained by known methods such as those described in D. Graebling, "Synthesis of Branched Polypropylene by a Reactive Extrusion Process," Macromolecules, 35(12), 4602-4610 (2002); Langston et al., "One-pot process of preparing long chain branched polypropylene using C[2]-symmetric metallocene complex and a T reagent," Macromolecules, 38(14), 5849-5853, (2005); and U.S. Pat. Nos. 6,599,985 and 6,875,826, all of which are incorporated herein by reference.

The amount of the polypropylene in the polymer composition varies by application. Typically, the amount can be from about 5 wt % to about 95 wt %. In some embodiments, the amount of the polypropylene in the polymer composition is from about 10 wt % to about 90 wt %, from about 15 wt % to about 85 wt %, from about 20 wt % to about 75 wt %, or from about 25 wt % to about 70 wt %, based on the total weight of the polymer composition. In other embodiments, the polymer composition comprises the ethylene/α-olefin interpolymer and the polypropylene in a ratio of about 10:1, about 5:1, about 3:1, about 1:1, about 1:3, about 1:5 or about 1:10 by weight. In further embodiments, the amount of the polypropylene in the polymer composition is about 10 wt %, about 20 wt %, about 25 wt %, about 30 wt %, about 40 wt % or about 50 wt %, based on the total weight of the polymer composition. In certain embodiments, the amount of the polypropylene in the polymer composition is from about 20 wt % to about 25 wt %, based on the total weight of the polymer composition.

Additives

Optionally, the polymer compositions disclosed herein can comprise at least one additive composition for the purposes of improving and/or controlling the processability, appearance, physical, chemical, and/or mechanical properties of the polymer compositions. Conventional plastics additives known to a person of ordinary skill in the art may be useful in the polymer compositions disclosed herein. Non-limiting examples of suitable additives for the additive composition include mold release agents, polysiloxanes, slip agents, plasticizers, oils, antioxidants, UV stabilizers, colorants or pigments, fillers, lubricants, antifogging agents, flow aids, coupling agents, cross-linking agents, nucleating agents, surfactants, solvents, flame retardants, antistatic agents, antimicrobials, scratch or mar resistance agents, and combinations thereof. In some embodiments, the polymer compositions do not comprise a polysiloxane, a slip agent, a plasticizer, an oil, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, an antimicrobial, a scratch or mar resistance agent, or any combination of two or more of the additives. In further embodiments, the polymer compositions do not comprise any additive.

The amount of additive depends on the polymers employed, the desired applications, and the type of additive. Typically when additives are employed, the total amount of the additives can range from about greater than 0 wt % to about 50 wt %, from about 0.001 wt % to about 40 wt %, from about 0.01 wt % to about 30 wt %, from about 0.1 wt % to about 20 wt %, from about 0.5 wt % to about 10 wt %, or from about 1 wt % to about 5 wt %, based on the total weight of the polymer composition. Some polymer additives have been described in Zweifel Hans et al., "*Plastics Additives Handbook*," Hanser Gardner Publications. Cincinnati, Ohio, 5th edition (2001), which is incorporated herein by reference in its entirety.

Optionally, the polymer compositions disclosed herein can comprise at least a polysiloxane additive. Any polysiloxane that (1) can provide processing improvements, such as better mold filling, less extruder torque, internal lubrication, mold release and faster throughput, and/or (2) can modify surface characteristics, such as higher lubricity, less slip, lower coefficient of friction, and greater mar and abrasion resistance can be used. In some embodiments, the polysiloxane is or comprises a high molecular weight polysiloxane. In further embodiments, the polysiloxane is or comprises an ultra-high molecular weight polydialkylsiloxane. Some non-limiting examples of suitable polydialkylsiloxane include polydialkylsiloxanes having a $C_{1-4}$ alkyl group, such as polydimethylsiloxanes, polydiethylsiloxanes, polymethylethylsiloxanes, polydipropylsiloxanes and polydibutylsiloxanes. In certain embodiments, the polysiloxane additive is or comprises a mixture of an ultra-high molecular weight polydialkylsiloxane and a polyolefin, such as polyethylene, polypropylene or a combination thereof. Some non-limiting examples of such polysiloxane mixtures include DOW CORNING® MB50 series Masterbatches such as DOW CORNING® MB50-001, MB50-002, MB50-313, MB50-314 and MB50-321, all of which are available from Dow Corning Corporation, Midland, Mich.

In other embodiments, the polysiloxane is or comprises a liquid polysiloxane. Some non-limiting examples of liquid polysiloxane include low molecular weight polydialkylsiloxanes, low molecular weight polyalkylphenylsiloxanes, and modified siloxane oils such as olefin-modified siloxane oils, polyether-modified silicone oils, olefin/polyether-modified silicone oils, epoxy-modified silicone oils and alcohol-modified silicone oils.

In some embodiments, the polysiloxane additive is or comprises a polydialkylsiloxane having a viscosity from about 1,000 to about 100,000 centistokes. In other embodiments, the polysiloxane additive is or comprises a polydialkylsiloxane having a viscosity from about 100,000 to about 1,000,000. In further embodiments, the polysiloxane additive is or comprises a polydialkylsiloxane having a viscosity from about 1,000,000 to about 10,000,000 centistokes. In certain embodiments, the polysiloxane additive is or comprises a polydialkylsiloxane having a viscosity from about 10,000,000 to about 50,000,000 centistokes.

When used, the amount of the polysiloxane additive in the polymer composition can be from about 0.1 wt % to about 5.0 wt %, based on the total weight of the polymer composition. In some embodiments, the amount of the polysiloxane additive in the polymer composition is from about 0.1 wt % to about 1.0 wt or from about 1 wt % to about 5 wt %, based on the total weight of the polymer composition. In other embodiments, the amount of the polysiloxane additive in the polymer composition is from about 0.15 wt % to about 0.4 wt %, based on the total weight of the polymer composition. In some embodiments, the polymer compositions do not comprise a polysiloxane.

In some embodiments, the polymer compositions disclosed herein optionally comprise a colorant or pigment that can change the look of the polymer compositions to human eyes. Any colorant or pigment known to a person of ordinary skill in the art may be added to the polymer compositions disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. When used, the amount of the colorant or pigment in the polymer composition can be from about greater than 0 to about 10 wt %, from about 0.1 to about 5 wt %, or from about 0.25 to about 3 wt %, based on the total weight of the polymer composition. In some embodiments, the polymer compositions do not comprise a colorant or pigment. Some typical colorants and/or pigments have been described in Zweifel Hans et al., "*Plastics Additives Handbook,*" Hanser Gardner Publications, Cincinnati, Ohio, 5th edition, Chapter 15, pages 813-882 (2001), which is incorporated herein by reference.

Optionally, the polymer compositions disclosed herein can comprise a plasticizer. In general, a plasticizer is a chemical that can increase the flexibility and lower the glass transition temperature of polymers. Any plasticizer known to a person of ordinary skill in the art may be added to the polymer compositions disclosed herein. Non-limiting examples of plasticizers include paraffinic oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. When used, the amount of the plasticizer in the polymer composition can be from greater than 0 to about 15 wt %, from about 0.5 to about 10 wt %, or from about 1 to about 5 wt % of the total weight of the polymer composition. In some embodiments, the polymer compositions do not comprise a plasticizer. Some plasticizers have been described in George Wypych, "*Handbook of Plasticizers,*" ChemTec Publishing, Toronto-Scarborough, Ontario (2004), which is incorporated herein by reference.

In some embodiments, the polymer compositions disclosed herein optionally comprise an antioxidant that can prevent the oxidation of polymer components and organic additives in the polymer compositions. Any antioxidant known to a person of ordinary skill in the art may be added to the polymer compositions disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyldiaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, N.Y.); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. When used, the amount of the antioxidant in the polymer composition can be from about greater than 0 to about 5 wt %, from about 0.0001 to about 2.5 wt %, from about 0.001 to about 1 wt %, or from about 0.001 to about 0.5 wt % of the total weight of the polymer composition. In some embodiments, the polymer compositions do not comprise an antioxidant. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, the polymer compositions disclosed herein optionally comprise an UV stabilizer that may prevent or reduce the degradation of the polymer compositions by UV radiations. Any UV stabilizer known to a person of ordinary skill in the art may be added to the polymer compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. When used, the amount of the UV stabilizer in the polymer composition can be from about greater than 0 to about 5 wt %, from about 0.01 to about 3 wt %, from about 0.1 to about 2 wt %, or from about 0.1 to about 1 wt % of the total weight of the polymer composition. In some embodiments, the polymer compositions do not comprise a UV stabilizer. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

Optionally, the polymer compositions disclosed herein can comprise a filler which can be used to adjust, inter alia, volume, weight, costs, and/or technical performance. Any filler known to a person of ordinary skill in the art may be added to the polymer compositions disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. When used, the amount of the filler in the polymer composition can be from about greater than 0 to about 80 wt %, from about 0.1 to about 60 wt %, from about 0.5 to about 40 wt %, from about 1 to about 30 wt %, or from about 10 to about 40 wt % of the total weight of the polymer composition. In some embodiments, the polymer compositions do not comprise a filler. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, the polymer compositions disclosed herein can comprise a lubricant. In general, the lubricant can be used, inter alia, to modify the rheology of the molten polymer compositions, to improve the surface finish of molded articles, and/or to facilitate the dispersion of fillers or pigments. Any lubricant known to a person of ordinary skill in the art may be added to the polymer compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. When used, the amount of the lubricant in the polymer composition can be from about greater than 0 to about 5 wt %, from about 0.1 to about 4 wt %, or from about 0.1 to about 3 wt % of the total weight of the polymer composition. In some embodiments, the polymer compositions do not comprise a lubricant. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polymer compositions disclosed herein can comprise an antistatic agent. Generally, the antistatic agent can increase the conductivity of the polymer compositions and to prevent static charge accumulation. Any antistatic agent known to a person of ordinary skill in the art may be added to the polymer compositions disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. When used, the amount of the antistatic agent in the polymer composition can be from about greater than 0 to about 5 wt %, from about 0.01 to about 3 wt %, or from about 0.1 to about 2 wt % of the total weight of the polymer composition. In some embodiments, the polymer compositions do not comprise an antistatic agent. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

In further embodiments, the polymer compositions disclosed herein optionally comprise a cross-linking agent that can be used to increase the cross-linking density of the polymer compositions. As used herein, "cross-linking agent" is any means which cross-links the polymer compositions. Thus, cross-linking agents may be chemical compounds but are not necessarily so, Non-limiting examples of cross-linking agents as used herein also include electron-beam irradiation, beta irradiation, gamma irradiation, corona irradiation, allyl compounds and UV radiation with or without crosslinking catalyst organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). U.S. Pat. Nos. 6,803,014 and 6,667,351 disclose electron-beam irradiation methods that can be used in embodiments of the invention. When used, the amount of a chemical compound as a cross-linking agent in the polymer composition can be from about greater than 0 to about 20 wt %, from about 0.1 to about 15 wt %, or from about 1 to about 10 wt % of the total weight of the polymer composition. In some embodiments, the polymer compositions do not comprise a cross-linking agent. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

In further embodiments, the polymer compositions disclosed herein optionally comprise a coagent or coupling agent. Such coagents or coupling agents may be employed with the cross-linking agents mentioned above. Any suitable coagent or coupling agent known to a person of ordinary skill in the art may be added to the polymer compositions disclosed herein. Non-limiting examples of suitable agents include those based on acrylate compounds, allyl compounds, etc.

Preparation of the Polymer Compositions

The ingredients of the polymer compositions, i.e., the ethylene/α-olefin interpolymer, the polypropylene, and the optional additives, can be mixed or blended using methods known to a person of ordinary skill in the art, preferably methods that can provide a substantially homogeneous distribution of the polypropylene and/or the additives in the ethylene/α-olefin interpolymer. Non-limiting examples of suitable blending methods include dry blending, melt blending, solvent blending, extruding, and the like.

In some embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the polymer composition. The mixing or blending of polymers by extrusion has been described in C. Rauwendaal, "*Polymer Extrusion*", Hanser Publishers, New York, N.Y., pages 322-334 (1986), which is incorporated herein by reference.

Applications of the Polymer Compositions

The polymer compositions disclosed herein can be used to manufacture plastic sheets or webs or rolls that can be used to prepare various thermoformed articles for the automotive, construction, medical, food and beverage, electrical, appliance, business machine, and consumer markets. In some embodiments, the sheets comprising the polymer compositions are thermoformed into interior articles such as panels or decorative skins providing surface aesthetics without paint for automobiles or other transportation vehicles. In other embodiments, the sheets comprising the polymer compositions are thermoformed into exterior articles such as front bumper fascia, running boards, tonneau covers, roof panel, truck and trailer panels like fenders and end caps for automobiles and utility vehicles. In further embodiments, the sheets comprising the polymer compositions are used to replace steel, aluminum, glass-reinforced composites, and plastics in various applications for the automotive, construction, medical, food and beverage, electrical, appliance, business machine, and consumer markets.

The polymer compositions can be turn into sheets or webs or rolls with known polymer processes such as extrusion (e.g., sheet extrusion and profile extrusion), injection molding, injection overmolding, molding, and rotational molding. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "Polymer Extrusion", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding including overmolding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

In some embodiments, the polymer compositions are extruded into sheets or webs or rolls which can be subsequently used to prepare various articles by thermoforming or other plastic processes known to skilled artisans. The extruded sheets or webs or rolls can have a single layer or multi-layer construction. Generally, the extruded sheets or webs or rolls can have a thickness from about 0.01 inches to about 1.0 inch (0.254 mm to 2.54 cm), from about 0.05 inches to about 0.75 inches (1.27 mm to 1.91 cm), or from about 0.1 to about 0.5 inches (2.54 mm to 1.27 cm).

The extruded sheets or webs or rolls in general can be used to make various thermoformed articles by the thermoforming process. Thermoforming is the pressing or squeezing of a pliable material, such as thermoplastic sheets, into final shape. The pliable material can be heated by infrared, natural gas, or other heaters or ovens to its forming temperature. Then, it can be stretched over or into a temperature-controlled, single-surface mold. The molds can be etched with patterns ranging from fine to coarse to simulate an artificial or a natural or grain like texturized look. The pliable material is held against the mold surface unit until cooled. The formed part is then trimmed from the pliable material. There are several categories of thermoforming, including vacuum forming, pressure forming, twin-sheet forming, drape forming, free blowing, and simple sheet bending. Various thermoforming processes are disclosed in books such as L. Throne, "*Understanding Thermoforming*," Hanser Gardner Publications, Inc., Cincinnati Ohio, 1999; and J. L. Throne, "*Technology of Thermoforming," Hanser Verlag, Munich, 1996, both of which are incorporated herein by reference.

Forming techniques other than conventional thermoforming processes are also suitable for the manufacture of articles from the polymer compositions disclosed herein. These include variations such as pre-softening the extruded sheet to temperatures below the final melting temperature, cutting flat regions (i.e., blanks) from the sheet, transfer of blanks by gravity or mechanical means into matched molds whereby the blanks are shaped into the article by heat and pressure. Conventional paperboard pressing equipment and corresponding forming tooling is optionally modified to produce articles of this invention.

The thermoforming process can be carried out in a temperature higher than the softening temperature of the polymer compositions disclosed herein. In some embodiments, the thermoforming temperature is from about 80° C. to about 300° C., from about 100° C. to about 280° C., from about 120° C. to about 260° C., or from about 140° C. to about 240° C. In other embodiments, the thermoforming temperature is from about 160° C. to about 220° C.

In some embodiments, the polymer compositions disclosed herein can be used for making films or hollow articles such as plastics containers by blow molding. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding*," Hanser Gardner Publications, Cincinnati, Ohio (2000), which is incorporated herein by reference in its entirety.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:
GPC Method for Samples 1-4 and A-C An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software Peaks are manually integrated and the molecular weight information reported uncorrected against a polystyrene standard calibration curve.
Standard CRYSTAF Method Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.
DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.
GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)):
$M_{polyethylene} = 0.431(M_{polystyrene})$ Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, for polyethylene is typically measured in accordance with ASTM D 1238, Condition 190° C./2.16 kg. Melt index, or $I_{10}$ for polyethylene is also measured in accordance with ASTM D 1238, Condition 190° C./10 kg. Melt flow rate for polypropylene is typically measured in accordance with ASTM 1238, Condition 230° C./2.16 kg.

ATREF

Analytical temperature rising elution fractionation (ATREF) analysis is conducted according to the method described in U.S. Pat. No. 4,798,081 and Wilde, Ryle, T. R.; Knobeloch, D. C.; Peat, I. R.; *Determination of Branching Distributions in Polyethylene and Ethylene Copolymers, J. Polym. Sci.*, 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL ECLIPSE™ 400 MHz spectrometer or a Varian Unity PLUS™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C. then slow cooled to 20° C. at 0.04° C. per minute and held for one hour. Fresh TCB is introduced at about 65 in while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl)zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1

A mixture of methyldi(C$_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B(C$_6$F$_5$)$_4$], substantially as disclosed in U.S. Pat. No. 5,919.9883, Ex. 2.

Cocatalyst 2

Mixed C$_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents

The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

Examples 1-4

Comparative A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons

[2]Bimodal molecular weight distribution

It may be seen the polymers produced according to the invention have a relatively narrow polydispersity (Mw/Mn) and larger block-copolymer content (trimer, tetramer, or larger) than polymers prepared in the absence of the shunting agent.

Further characterizing data for the polymers of Table 1 are determined by reference to the figures. More specifically DSC and ATREF results show the following:

The DSC curve for the polymer of Example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of Example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of Example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of Example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for Comparative Example A* shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for Comparative Example B* shows a 129.8° C. melting point (Tm) with a heat of fusion of 237.0 μg. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for Comparative Example C* shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19

Comparative Examples D*-F*, Continuous Solution Polymerization, Catalyst A1/B2+DEZ Continuous solution polymerizations are carried out in a computer controlled autoclave reactor equipped with an internal stirrer. Purified mixed alkanes solvent (ISOPAR™ E available from ExxonMobil Chemical Company), ethylene at 2.70 lbs/hour (1.22 kg/hour), 1-octene, and hydrogen (when used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (when used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T ° C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/$ $[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |

TABLE 2-continued

Process details for preparation of exemplary polymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]^4$ | Poly Rate[5] kg/hr | Conv %[6] | Solids % | Eff.[7] |
|---|---|---|---|---|---|---|---|---|---|---|---|---|---|---|---|---|---|
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative Example, not an example of the invention
[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor
[5] polymer production rate
[6] percent ethylene conversion in reactor
[7] efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (°C.) | $T_c$ (°C.) | $T_{CRYSTAF}$ (°C.) | Tm – $T_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

*Comparative Example, not an example of the invention

The resulting polymers are tested by DSC and ATREF as with previous examples. Results are as follows:

The DSC curve for the polymer of Example 5 shows a peak with a 119.6° C. melting point (Tm) with a heat of fusion of 60.0 kg. The corresponding CRYSTAF curve shows the tallest peak at 47.6° C. with a peak area of 59.5 percent. The delta between the DSC Tm and the Tcrystaf is 72.0° C.

The DSC curve for the polymer of Example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of Example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of Example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of Example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of Example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of Example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of Example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of Example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of Example 14 shows a peak with a 120.8° C. melting point (Tm) with a heat of fusion of 127.9

J/g. The corresponding CRYSTAF curve shows the tallest peak at 72.9° C. with a peak area of 92.2 percent. The delta between the DSC Tm and the Tcrystaf is 47.9° C.

The DSC curve for the polymer of Example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of Example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of Example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of Example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of Example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of Comparative Example D* shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of Comparative Example E* shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of Comparative Example F* shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative Example I* is a substantially linear ethylene/1-octene copolymer (AFFINITY®PL1840, available from The Dow Chemical Company). Comparative Example J* is a hydrogenated styrene/butadiene/styrene triblock copolymer (KRATON™ G1652, available from KRATON Polymers), Comparative Example K* is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
| --- | --- | --- | --- | --- | --- |
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative Example F* (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative Example J* (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G"(100° C.), for the inventive polymers of 6 or less, whereas a physical blend (Comparative Example F*) has a storage modulus ratio of 9 and a random ethylene/octene copolymer (Comparative Example G*) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparative Examples F* and G* which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparative Examples F*, G*, H* and J* all have a 70° C. compression set of 100 percent (the maximum possible value, indicating no recovery). Good high temperature compression set (low numerical values) is especially needed for applications such as gaskets, window profiles, O-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) |
|---|---|---|---|---|---|---|---|---|
| D* | 12 | 5 | — | — | 10 | 1074 | — | — |
| E* | 895 | 589 | | — | 31 | 1029 | — | — |
| F* | 57 | 46 | — | — | 12 | 824 | 93 | 339 |
| 5 | 30 | 24 | 14 | 951 | 16 | 1116 | 48 | — |
| 6 | 33 | 29 | — | — | 14 | 938 | — | — |
| 7 | 44 | 37 | 15 | 846 | 14 | 854 | 39 | — |
| 8 | 41 | 35 | 13 | 785 | 14 | 810 | 45 | 461 |
| 9 | 43 | 38 | — | — | 12 | 823 | — | — |
| 10 | 23 | 23 | — | — | 14 | 902 | — | — |
| 11 | 30 | 26 | — | — | 16 | 1090 | — | 976 |
| 12 | 20 | 17 | 12 | 961 | 13 | 931 | — | 1247 |
| 13 | 16 | 14 | — | — | 13 | 814 | — | 691 |
| 14 | 212 | 160 | — | — | 29 | 857 | — | — |
| 15 | 18 | 14 | 12 | 1127 | 10 | 1573 | — | 2074 |
| 16 | 23 | 20 | — | — | 12 | 968 | — | — |
| 17 | 20 | 18 | — | — | 13 | 1252 | — | 1274 |
| 18 | 323 | 239 | — | — | 30 | 808 | — | — |
| 19 | 706 | 483 | — | — | 36 | 871 | — | — |
| G* | 15 | 15 | — | — | 17 | 1000 | — | 746 |
| H* | 16 | 15 | — | — | 15 | 829 | — | 569 |
| I* | 210 | 147 | — | — | 29 | 697 | — | — |
| J* | — | — | — | — | 32 | 609 | — | — |
| K* | — | — | — | — | — | — | — | — |

| Ex. | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|
| D* | 91 | 83 | 760 | — | — |
| E* | — | — | — | — | — |
| F* | 78 | 65 | 400 | 42 | — |
| 5 | 87 | 74 | 790 | 14 | 33 |
| 6 | — | 75 | 861 | 13 | — |
| 7 | 82 | 73 | 810 | 20 | — |
| 8 | 82 | 74 | 760 | 22 | — |
| 9 | — | — | — | 25 | — |
| 10 | 86 | 75 | 860 | 12 | — |
| 11 | 89 | 66 | 510 | 14 | 30 |
| 12 | 91 | 75 | 700 | 17 | — |
| 13 | 91 | — | — | 21 | — |
| 14 | — | — | — | — | — |
| 15 | 89 | 83 | 770 | 14 | — |
| 16 | 88 | 83 | 1040 | 13 | — |
| 17 | 13 | 83 | 920 | 4 | — |
| 18 | — | — | — | — | — |
| 19 | — | — | — | — | — |
| G* | 86 | 53 | 110 | 27 | 50 |
| H* | 87 | 60 | 380 | 23 | — |
| I* | — | — | — | — | — |
| J* | 93 | 96 | 1900 | 25 | — |
| K* | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F*, G* and H* have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative Example G*. Lower stress relaxation means that the polymer retains its force better in applications such as diapers and other garments where retention of elastic properties over long time periods at body temperatures is desired.

Optical Testing

TABLE 6

| | Polymer Optical Properties | | |
|---|---|---|---|
| Ex. | Internal Haze (percent) | Clarity (percent) | 45° Gloss (percent) |
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |

TABLE 6-continued

| | Polymer Optical Properties | | |
|---|---|---|---|
| Ex. | Internal Haze (percent) | Clarity (percent) | 45° Gloss (percent) |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of Examples 5, 7 and Comparative Example E* are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours.

At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Additional Polymer Examples 19A-K

Continuous Solution Polymerization, Catalyst A1/B2+DEZ

Continuous solution polymerizations are carried out in a computer controlled well-mixed reactor. Purified mixed alkanes solvent (ISOPAR™ E available from ExxonMobil Chemical Company), ethylene. 1-octene, and hydrogen (when used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psi pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

Process details and results are contained in Table 8 and 8(a). Selected polymer properties are provided in Tables 9 and 9(a).

TABLE 8

Polymerization Conditions for Polymers 19a-j.

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19a | 55.29 | 32.03 | 323.03 | 101 | 120 | 600 | 0.25 | 200 | 0.42 | 3.0 | 0.70 |
| 19b | 53.95 | 28.96 | 325.3 | 577 | 120 | 600 | 0.25 | 200 | 0.55 | 3.0 | 0.24 |
| 19c | 55.53 | 30.97 | 324.37 | 550 | 120 | 600 | 0.216 | 200 | 0.609 | 3.0 | 0.69 |
| 19d | 54.83 | 30.58 | 326.33 | 60 | 120 | 600 | 0.22 | 200 | 0.63 | 3.0 | 1.39 |
| 19e | 54.95 | 31.73 | 326.75 | 251 | 120 | 600 | 0.21 | 200 | 0.61 | 3.0 | 1.04 |
| 19f | 50.43 | 34.80 | 330.33 | 124 | 120 | 600 | 0.20 | 200 | 0.60 | 3.0 | 0.74 |
| 19g | 50.25 | 33.08 | 325.61 | 188 | 120 | 600 | 0.19 | 200 | 0.59 | 3.0 | 0.54 |
| 19h | 50.15 | 34.87 | 318.17 | 58 | 120 | 600 | 0.21 | 200 | 0.66 | 3.0 | 0.70 |
| 19i | 55.02 | 34.02 | 323.59 | 53 | 120 | 600 | 0.44 | 200 | 0.74 | 3.0 | 1.72 |
| 19j | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | $Zn^4$ in polymer ppm | Poly. Rate[5] lb/hr | Conv[6] wt % | Polymer wt % | Eff.[7] |
|---|---|---|---|---|---|---|---|---|---|
| 19a | 4500 | 0.65 | 525 | 0.33 | 248 | 83.94 | 88.0 | 17.28 | 297 |
| 19b | 4500 | 0.63 | 525 | 0.11 | 90 | 80.72 | 88.1 | 17.2 | 295 |
| 19c | 4500 | 0.61 | 525 | 0.33 | 246 | 84.13 | 88.9 | 17.16 | 293 |
| 19d | 4500 | 0.66 | 525 | 0.66 | 491 | 82.56 | 88.1 | 17.07 | 280 |
| 19e | 4500 | 0.64 | 525 | 0.49 | 368 | 84.11 | 88.4 | 17.43 | 288 |
| 19f | 4500 | 0.52 | 525 | 0.35 | 257 | 85.31 | 87.5 | 17.09 | 319 |
| 19g | 4500 | 0.51 | 525 | 0.16 | 194 | 83.72 | 87.5 | 17.34 | 333 |
| 19h | 4500 | 0.52 | 525 | 0.70 | 259 | 83.21 | 88.0 | 17.46 | 312 |
| 19i | 4500 | 0.70 | 525 | 1.65 | 600 | 86.63 | 88.0 | 17.6 | 275 |
| 19j | — | — | — | — | — | — | — | — | — |

TABLE 8a

Polymerization Conditions for Polymer 19k.

| Ex. | $C_8H_{16}$ kg/hr | Solv. kg/hr | $H_2$ sccm[1] | T °C. | Cat A1[2] ppm | Cat A1 Flow kg/hr | Cat A2[3] ppm | A2 Flow kg/hr | DEZ Conc (ppm Zn) | DEZ Flow kg/hr |
|---|---|---|---|---|---|---|---|---|---|---|
| 19k | 37.7 | 436.1 | 697 | 120 | 495 | 0.663 | 100 | 0.638 | 14994 | 0.883 |

| Ex. | Cocat Conc. ppm | Cocat Flow kg/hr | $[C_2H_4]/[DEZ]^4$ | Poly. Rate[5] kg/hr | Conv %[6] | Solids % | Eff.[7] |
|---|---|---|---|---|---|---|---|
| 19k | 3997 | 0.893 | 1282 | 94.1 | 88.7 | 17.7 | 241 |

[1] standard $cm^3$/min
[2] [N-2,6-di(1-methylethyl)phenyl]amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance
[5] polymer production rate
[6] weight percent ethylene conversion in reactor
[7] efficiency, kg polymer/g M where g M = g Hf + g Z

TABLE 9

Polymer Physical properties

| Polymer Ex. No. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19g | 0.8649 | 0.9 | 6.4 | 7.1 | 135000 | 64800 | 2.1 | 26 | 120 | 92 | 30 | 90 | 90 |
| 19h | 0.8654 | 1.0 | 7.0 | 7.1 | 131600 | 66900 | 2.0 | 26 | 118 | 88 | — | — | — |
| 19k | 0.877 | 0.5 | 3.9 | 7.2 | 144500 | 69400 | 2.1 | 48 | 120 | 99 | 89 | 31 | 17 |

TABLE 9A

Average Block Index For exemplary polymers[1]

| Example | $Zn/C_2^{2}$ | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1]Additional information regarding the calculation of the block indices for various polymers is disclosed in U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2]$Zn/C_2$ *1000 = (Zn feed flow*Zn concentration/1000000/Mw of Zn)/(Total Ethylene feed flow*(1-fractional ethylene conversion rate)/Mw of Ethylene)*1000. Please note that "Zn" in "$Zn/C_2$*1000" refers to the amount of zinc in diethyl zinc ("DEZ") used in the polymerization process, and "C2" refers to the amount of ethylene used in the polymerization process.

The following table describes the polypropylene designations used in the examples.

| Polypropylene Designation | Description |
|---|---|
| POE-1 | an ethylene propylene special purpose high melt strength elastomer, 0.875 g/cc, <0.5 MI at 190° C. (I₂), tan delta at 0.1 rad/s of 1.25 available from The Dow Chemical Company. |
| PP-2 | PRO-FAX PF814 available from Basell Polyolefins Inc. is an extrusion grade special purpose high melt strength homopolymer PP, 2.5 MFR (230° C., g/10 min), tan delta at 0.1 rad/s of 1.3. |
| PP-3 | Daploy WB130HMS resin available from Borealis, a propylene-based, structurally isomeric polymer, 2.1 MFR (230° C., g/10 min), tan delta at 0.1 rad/s of 1.3. |
| PP-4 | Pro-fax SR256M, an extrusion grade random copolymer PP, 2 MFR(230° C., g/10 min), tan delta at 0.1 rad/s of 4.5, available from Basell Polyolefins Inc. |
| PP-5 | D114.00 Developmental Performance Polymer available from The Dow Chemical Company which is an azide modified impact copolymer polypropylene with 14% ethylene-propylene rubber and a tan delta at 0.1 rad/s of 1.6 |
| PP-6 | D6D83K, extrusion blow molding grade random polypropylene copolymer 1.9 MFR (230° C., g/10 min), 0.9 g/cc density, available from The Dow Chemical Company |

Example 20 and Comparative Example L

Polymer compositions Example 20 and Comparative Example L were prepared by blending the respective list of ingredients as shown in Table 10 below. The ingredients were mixed to form Example 20 and Comparative Example L by the following compounding method. The melt blending of the formulations was performed using a Coperion ZSK25 corotating twin screw extruder equipped with a medium shear screw stack. Barrel and die conditions were set at 50 lbs/hr, with the following zone temperatures, Zone 1 was 140° C., Zone 2-7 were 200° C., and the Zone 8, at the die, was 180° C.

TABLE 10

|  | Comparative Ex. L | Example 20 |
|---|---|---|
| POE-1 | 73.1 | 0 |
| PP-2 | 24.4 | 24.4 |
| MB50-002 | 0.5 | 0.5 |
| Americhem gray concentrate | 2.0 | 2.0 |
| OBC | 0 | 73.1 |

Note:
MB50-002 is a a pelletized formulation containing 50% of an ultra-high molecular weight siloxane polymer dispersed in polyethylene (LDPE) homopolymer available from The Dow Corning Corporation, Midland, MI; Americhem gray concentrate is a colorant from Americhem, Cuyahoga Falls, OH; and OBC is Polymer Example 19k above which is an ethylene/α-olefin interpolymer having a density of 0.877 g/cc and a melt index of 0.5 prepared according to the general preparation procedure for Polymer Examples 19k above.

Extruded sheets Example 21 and Comparative Example M were prepared from Example 20 and Comparative Example L respectively by extrusion according to the following procedure. The compounded strand chopped pellets were extruded on a Killion extruder equipped with a 24 inch die. The die lips were adjusted to yield 40 mils thick sheeting. The sheet-line ran at a rate of 3.6 Ft/min. With a top, middle and bottom roll temperatures of 40° C., 40° C. and 30° C., respectively.

The extruded sheets Example 21 and Comparative Example M were thermoformed into sheets at 160° C., 170° C., 180° C., 190° C., 200° C., and 220° C. respectively by the following procedure. The sheets were thermoformed using a Lamco thermoformer equipped with 12 individually controlled quartz heaters, top and bottom. An infrared pyrometer was positioned at the bottom of the oven to monitor sheet surface temperature. The sheeting was vacuum formed over a male tool, formed at the designated temperature.

The scratch resistances of the extruded and thermoformed sheets were measured according to a modification of ASTM D7027-05 Standard Test Method for Evaluation of Scratch Resistance of Polymeric Coatings and Plastics Using an Instrumented Scratch Machine. The scratch resistances were measured using the Texas A&M scratch test machine described in "A new test methodology for evaluating scratch resistance of polymers," by M. Wong, G. T. Lim, A. Moyse, J. N. Reddy, and H.-J. Sue, *Wear*, Vol. 256, pp. 1214-1227 (2004), which is incorporated by reference.

Figure 11:
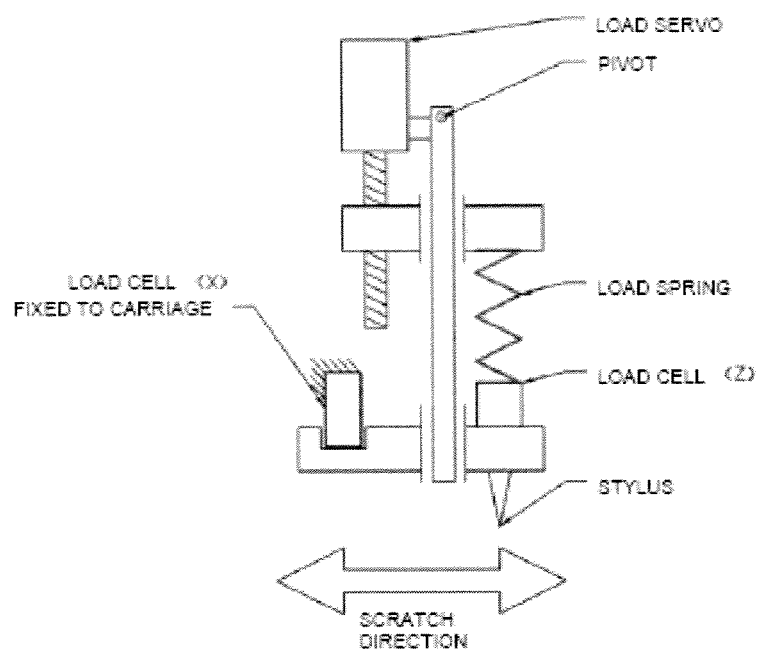
FIG. 11 shows a schematic of a scratch test machine used to measure scratch resistance.

The Texas A&M scratch test machine is schematically illustrated in FIG. 11. The scratch test device is built with the capability to execute single- or multi-pass, constant load, constant speed, increasing load and increasing speed test with the potential to operate under various ambient temperatures. The scratch test unit comprises of a servo gear-driven motor that drives the scratch tip or stylus with constant or linearly increased speeds. For constant speeds, the stylus can move in a range from 0 to 400 minis. As for linearly increased speeds, the stylus can be set to move from a zero speed to a peak speed of 400 mm/s. A range of scratching styli can be designed for the scratch test device to perform single- or multi-pass tests. The standard scratch stylus is a 1 mm diameter stainless steel spherical tip, comprised of Grade 10 steel or better. The test device is designed to conduct tests with load-controlled spring loads, with a load range of 0-100 N and a load cell sensitivity of 0.01 N. The test device is also equipped with sensing and data acquisition functions to record vital test data during testing, such as the tangential force acting on the stylus with an accuracy of 0.1 N for a load range up to 1000 N. The data acquired for depth, horizontal position and velocity of the stylus have accuracies of 5 μm, 5 μm and 10 μm/s, respectively. During tests, the test data are fed to an external computer for data storage and processing. Test parameters, such as number of scratch passes, scratch length and speed of the stylus, are controlled through an on-board microprocessor housed in an instrumentation unit.

The modified ASTM D7027-05 test used herein was conducted at approximately room temperature and 50% humidity using a scratch speed of 50 mm per second, a scratch length of 80 mm. The load was increased linearly from 1 to 20 N and the data collection rate was 1000 points per second. The scratch resistance data of Example 21 and Comparative Example M are listed in Table 11A below. The data show that the scratch resistance of Example 21 is higher than that of Comparative Example M.

TABLE 11A

|  | Comparative Ex. M | Example 21 |
| --- | --- | --- |
| Load at onset of visible scratch whitening | 7 N | None up to 20 N loading |

The digital images of the scratches were obtained using an EPSON Perfection 4990 PHOTO flatbed scanner. Using the EPSON software, images were scanned in color using the Home Mode at 1600 dpi resolution. The samples were evaluated based on the point at which stress whitening, or other significant surface damage, was observed. To quantify the scratch resistance performance of these materials, the normal load at the onset of visible scratch whitening was reported.

A digital image of Example 21 and Comparative Example M after the scratch resistance test shows that Example 21 exhibits no sign of scratch whitening up to a loading of 20 N, whereas Comparative Example M exhibits scratch whitening at a loading of 7 N. Further, Example 21 shows a significant reduction in the extent of visible damage along the scratch incident. Due to the penetration of the scratch stylist into the soft TPO skin, slight gloss change may be observed in the Example 21 scratch, however, no physical scratch whitening was observed.

The gloss of the extruded and thermoformed sheets were measured according to the following method. Sheet gloss at a 60° incident angle was measured before and after thermoforming according to ASTM standard D2457.

The gloss data of the samples are listed in Table 11B below. The data show that the gloss of the extruded and thermoformed sheets from Example 21 are lower than those of Comparative Example M.

TABLE 11B

|  | Comparative Ex. M | Example 21 |
| --- | --- | --- |
| Gloss of Initial extruded sheet | 68.6 | 16.7 |
| Gloss after thermoformed at 160° C. | 10.9 | 3.8 |
| Gloss after thermoformed at 170° C. | 9.5 | 3.9 |
| Gloss after thermoformed at 180° C. | 14.2 | 3.4 |
| Gloss after thermoformed at 190° C. | 11.6 | 5.0 |
| Gloss after thermoformed at 200° C. | — | 4.2 |
| Gloss after thermoformed at 220° C. | 16.0 | 4.4 |

Reflected Light Under Nomarski.

Small pieces of approximately 10 mm×10 mm from each of Example 21 and Comparative Example M were cut and placed on a glass slide. The slides were placed into an SPI sputter coater and coated with a gold-palladium plasma for approximately 30 seconds to increase the reflectivity of the surfaces. An Olympus Vanox research microscope was used under reflected Nomarski interference contrast to image the surface topography of the sheets before and after heat treatment at 160° C., 170° C., 180° C., 190° C., 200° C., and 220° C. respectively. Images (as shown in FIGS. 8 A-D) were captured using a 20× objective lens for each of the samples and recorded digitally using a Nikon DXM-1200 digital camera.

The micrographs of Example 21 and Comparative Example M show that the extruded and thermoformed sheets of Example 21 have larger scale sized surface patterns in comparison to the extruded and thermoformed sheets of Comparative Example M. These larger scale patterns on the surface of sheets from Example 21 cause a higher surface roughness (see surface roughness data in Tables 12-16 below). It is found that the higher the surface roughness, the lower is the gloss. In fact, when comparing the extruded sample with the thermoformed sample (i.e., comparing FIGS. 8A with 8B and 8C with 8D), it can be seen that the size scale of these surface patterns in the optical micrographs increases after heat treatment. This may be due to the increased roughness after heat treatment which leads to lowering of the surface gloss.

Transmission Electron Microscopy.

Injection molded bars from polymer compositions Example 20 and Comparative Example M were trimmed so that sections could be collected at the skin and parallel to orientation. The trimmed samples were cryo-polished prior to staining by removing sections from the blocks at minus 60° C. to prevent smearing of the elastomer phases. The cryo-polished blocks were stained with the vapor of a 2% aqueous ruthenium tetraoxide solution for 3 hrs at ambient temperature. The staining solution was prepared by weighing 0.2 g of ruthenium (III) chloride hydrate ($RuCl_3 xH_2O$) into a glass bottle with a screw lid and adding 10 ml of 5.25% aqueous sodium hypochlorite to the jar. The samples were placed in the glass jar using a glass slide having double sided tape. The samples were placed faced down on the skin of interest so that the skin would be protected by the tape. The slide was placed in the bottle in order to suspend the blocks about 1 inch above the staining solution. Sections of approximately 100 nanometers in thickness were collected at ambient temperature using a diamond knife on a Leica EM UC6 microtome and placed on 400 mesh virgin TEM grids for observation. Images were collected on a JEOL JEM-1230 operated at 100 kV accelerating voltage and collected on a Gatan-791 and 794 digital cameras. The images were post processed using Adobe Photoshop 7.0.

Figure 9A:
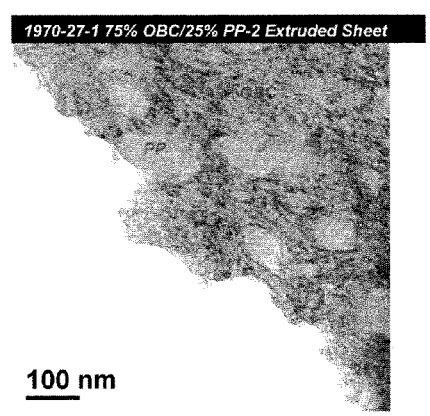
FIGS. 9A-D show TEM images taken at the surface of the extruded and heat-treated sheets of Example 21 (FIGS. 9A and 9B respectively) and Comparative Example M (FIGS. 9C and 9D respectively).
Figure 9B:
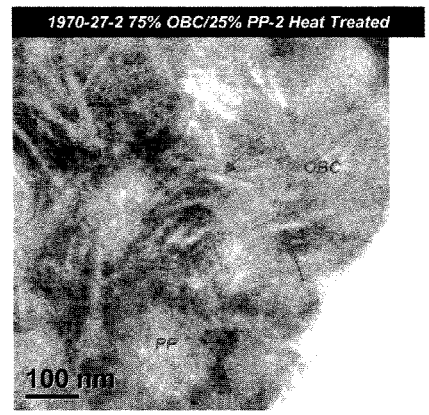
Figure 9C:
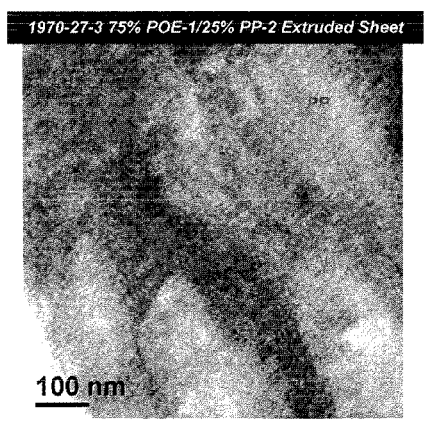
Figure 9D:
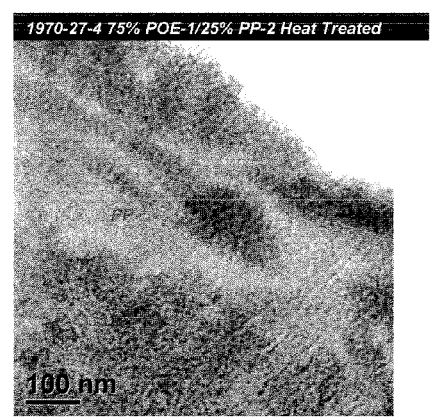

FIGS. 9A and 9B show polypropylene hard domains dispersed within the ethylene/α-olefin interpolymer matrix that is characterized by the lamellar morphology associated with the chain folded hard segment domains (arrowed). In contrast, the polypropylene/POE-1 blend shows the polypropylene hard domains dispersed within the POE-1 matrix that is characterized as a granular or "fringed micelle" morphology (FIGS. 9C & D). After thermoforming, the lamellar structure in the ethylene/α-olefin interpolymer coarsens (FIG. 9B) and is believed to contribute to the lower gloss observed in the ethylene/α-olefin interpolymer/polypropylene blend.

2D Profilometry.

Figure 10:
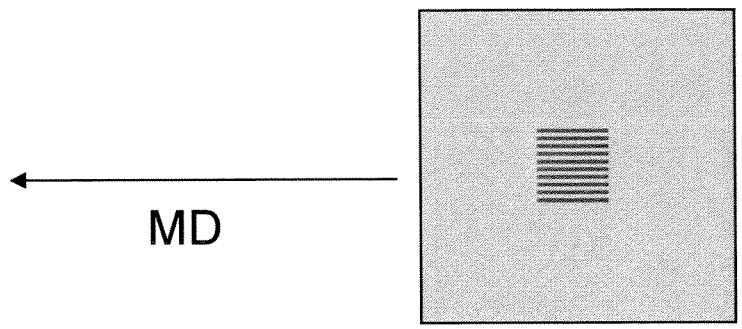
FIG. 10 shows the algorithms provided by the software resident on the Tencor P-15 (v 6.41).

Profilometry was obtained on a KLA-Tencor P-15 stylus profilometer using a 2 um radius diamond tip (60 degree cone) and a load of 0.5 milligrams. 2D line profiles were collected as a sequence and aligned parallel to the extrusion direction. Ten (10) 5 mm lines were spaced 0.5 mm apart. Each line consisted of 2500 points sampled at 50 pts/sec (50 seconds per line). The line data was collected using an 800 um long wavelength cutoff filter. This partitions the raw line data into two profiles: one for roughness and one for waviness (see FIG. 10). The surface roughness data of Example 21 and Comparative Example M before and after thermoforming are shown in Tables 12-16 below.

The profilometry results in Tables 12-16 showed that all roughness parameters (Ra, Rq, $Rz_{10}$, Rp, Rv) showed an increase following thermoforming with the relative magnitude of roughness of the ethylene/α-olefin interpolymer/polypropylene blend being substantially greater than that of the polypropylene/PP 1 blend.

TABLE 12

| Ra (nm) | Comp. Ex. M | Comp. Ex. M (T) | Example 21 | Example 21 (T) |
|---|---|---|---|---|
| Mean | 82.0 | 763.1 | 512.4 | 2985.4 |
| S.D. | 19.8 | 54.7 | 63.5 | 203.0 |
| Min | 59.2 | 674.8 | 401.4 | 2684.7 |
| Max | 118.5 | 845.8 | 603.4 | 3402.7 |
| Range | 59.3 | 171.0 | 202.0 | 718.1 |

Note:
Ra = Arithmetic average deviation of the absolute values of the roughness profile from the mean line or centerline. Also know as the centerline average roughness (CLA). The centerline divides profiles such that all areas above it equal all areas below it.

TABLE 13

| Rq (nm) | Comp. Ex. M | Comp. Ex. M (T) | Example 21 | Example 21 (T) |
|---|---|---|---|---|
| Mean | 144.4 | 978.9 | 727.6 | 3698.9 |
| S.D. | 56.8 | 89.1 | 91.4 | 232.2 |
| Min | 88.9 | 852.8 | 570.0 | 3435.2 |
| Max | 281.9 | 1099.9 | 848.5 | 4249.5 |
| Range | 193.0 | 247.1 | 278.5 | 814.3 |

Note:
Rq = The root-mean-square or geometric average deviation of the roughness profile from the mean line measured in the sampling length.

TABLE 14

| $Rz_{10}$ (nm) | Comp. Ex. M | Comp. Ex. M (T) | Example 21 | Example 21 (T) |
|---|---|---|---|---|
| Mean | 1064.6 | 5003.2 | 4471.8 | 16499.1 |
| S.D. | 325.2 | 788.9 | 592.8 | 1124.8 |
| Min | 674.1 | 4172.0 | 3526.5 | 15094.0 |
| Max | 1740.1 | 6447.8 | 5232.6 | 18643.5 |
| Range | 1065.9 | 2275.8 | 1706.1 | 3549.6 |

Note:
$Rz_{10}$ = The average height height difference between the 5 highest and the five deepest valleys within the sampling length measured from a line parallel to the mean line.

TABLE 15

| Rp (nm) | Comp. Ex. M | Comp. Ex. M (T) | Example 21 | Example 21 (T) |
|---|---|---|---|---|
| Mean | 1097 | 3314 | 1713 | 10555 |
| S.D. | 757 | 1967 | 1352 | 1714 |
| Min | 379 | 2043 | 778 | 8441 |
| Max | 2444 | 8780 | 5077 | 13815 |
| Range | 2066 | 6737 | 4299 | 5374 |

Note:
Rp = The distance between the mean line and the highest peak over the sampling length.

TABLE 16

| Rv (nm) | Comp. Ex. M | Comp. Ex. M (T) | Example 21 | Example 21 (T) |
|---|---|---|---|---|
| Mean | 1019 | 3200 | 4488 | 10147 |
| S.D. | 594 | 546 | 926 | 1581 |
| Min | 507 | 2301 | 3027 | 7891 |
| Max | 2377 | 4082 | 6077 | 13294 |
| Range | 1870 | 1781 | 3051 | 5403 |

Note:
Rv = The distance between the mean line and the lowest valley over the sampling length.

Examples 22-25

Polymer compositions Examples 22-25 were prepared by blending the respective list of ingredients as shown in Table 17 below. The ingredients were mixed to form Examples 22-25 by the following compounding method. The melt blending of the formulations was performed using a Coperion ZSK25 corotating twin screw extruder equipped with a medium shear screw stack. Barrel and die conditions were set at 50 lbs/hr, with the following zone temperatures, Zone 1 was 140° C., Zone 2-7 were 200° C., and the Zone 8, at the die, was 180° C.

TABLE 17

| | Example 22 | Example 23 | Example 24 | Example 25 |
|---|---|---|---|---|
| OBC | 73.1 | 73.1 | 73.1 | 73.1 |
| PP-3 | 24.4 | | | |
| PP-6 | | 24.4 | | |
| PP-2 | | | 24.4 | |
| PP-5 | | | | 24.4 |
| Color | 2.0 | 2.0 | 2.0 | 2.0 |
| PDMS | 0.5 | 0.5 | 0.5 | 0.5 |

Note:
OBC is Polymer Example 19k above which is an ethylene/α-olefin interpolymer having a density of 0.877 g/cc and a melt index of 0.5 prepared according to the general preparation procedure for Polymer Examples 19k above.

Extruded sheets of Examples 22-25 were prepared by extrusion according to the following procedure. The compounded strand chopped pellets were extruded on a Killion extruder equipped with a 24 inch die. The die lips were adjusted to yield 40 mils thick sheeting. The sheet-line ran at a rate of 3.6 Ft/min. With a top, middle and bottom roll temperatures of 40° C., 40° C. and 30° C., respectively.

The extruded sheets of Examples 22-25 were thermoformed into sheets at 160° C., 170° C., 180° C., and 190° C. by the following procedure. The sheets were thermoformed using a Lamco thermoformer equipped with 12 individually controlled quartz heaters, top and bottom. An infrared pyrometer was positioned at the bottom of the oven to monitor sheet surface temperature. The sheeting was vacuum formed over a male tool, formed at the designated temperature.

The gloss of the extruded and thermoformed sheets were measured according to the following method. Sheet gloss at a 60° incident angle was measured before and after thermoforming according to ASTM standard D2457. The gloss data (%) are listed in Table 18 below. The data shows that branched polypropylene exhibits lower gloss.

TABLE 18

|  | Example 22 | Example 23 | Example 24 | Example 25 |
|---|---|---|---|---|
| Gloss of Initial extruded sheet | 3.2 | 10.6 | 3.5 | 4.6 |
| Gloss after thermoformed at 160° C. | 3.2 | 17.1 | 3.0 | 4.4 |
| Gloss after thermoformed at 170° C. | 2.9 | 21.6 | 3.1 | 5.1 |
| Gloss after thermoformed at 180° C. | 2.7 | 21.1 | 3.2 | 4.8 |
| Gloss after thermoformed at 190° C. | 3.0 | 15.7 | 3.3 | 5.0 |

Comparative Example P and T

Comparative Examples P and T were prepared by blending the respective list of ingredients as shown in Table 19 below. The ingredients were mixed to form the Comparative Example P and T by the following compounding method. The melt blending of the formulations was performed using a Coperion ZSK25 corotating twin screw extruder equipped with a medium shear screw stack. Barrel and die conditions were set at 50 lbs/hr, with the following zone temperatures. Zone 1 at 140° C. Zone 2-7 at 200° C., and the Zone 8, at the die, 180° C.

TABLE 19

|  | Comp. Ex. P | Comp. Ex. T |
|---|---|---|
| POE-1 | 73.1 | 46.9 |
| PP-2 | 24.4 | 15.6 |
| $CaCO_3$ |  | 20 |
| oil |  | 15 |
| Americhem gray concentrate | 2 | 2 |
| MB50-002 | 0.5 | 0.5 |

Note:
Americhem gray concentrate is a colorant from Americhem, Cuyahoga Falls, OH; MB50-002 is a palletized formulation containing 50% of an ultra-high molecular weight siloxane polymner dispersed in polyethylene (LDPE) homopolymer from Dow Corning Corporation, Midland, MI.

Comparative example P and T were evaluated for physical properties such as TMA penetration testing, melt flow rates $I_2$ and $I_{10}$, Shore A hardness, density, tensile strength, elongation in machine direction, Die C tear strength in machine direction, compression set. The test results are presented in Table 20.

TABLE 20

| Properties | Comp. Ex. P | Comp. Ex. T |
|---|---|---|
| $I_2$ at 190° C. | 0.45 | 1.58 |
| $I_{10}$ at 190° C. | 12.82 | 36.42 |
| DSC Tcrystal (° C.) | 133.9 | 128 |
| TMA-1 mm penetration (° C.) | 128.00 | 110 |
| Melt strength (cN) | 8 | 6 |
| Melt strength (mm/s) | 160 | 175 |
| Density (g/cc) | 0.9 | 1.01 |

TABLE 20-continued

| Properties | Comp. Ex. P | Comp. Ex. T |
|---|---|---|
| Shore A | 84 | 74 |
| Tensile (MD, N/mm$^2$) | 6.7 | 3.7 |
| Elongation (MD) | 400 | 330 |
| Die C tear (MD) | 38.4 | 25.2 |
| Compression set (22 hrs at 23° C.), % | 39.7 | 24.26 |

The complex viscosities of Comparative Example P and T were also tested by the Rubber Process Analyzer (RPA-2000) from Alpha Technologies, Akron, Ohio. The RPA testing results are shown in Table 21. The data shows that the complex viscosity (units of Pa-seconds) decreases with increasing shear rate (units of reciprocal seconds).

TABLE 21

| Shear Rate | Comp. Ex. P | Comp. Ex. T |
|---|---|---|
| 0.01 | 74454 | 31987 |
| 0.02 | 55041 | 19288 |
| 0.03 | 40383 | 16551 |
| 0.05 | 32274 | 14602 |
| 0.15 | 16630 | 7266 |
| 0.3 | 11122 | 5049 |
| 0.75 | 6497 | 3105 |
| 1.51 | 4275 | 2096 |
| 3.01 | 2880 | 1495 |
| 7.53 | 1672 | 895 |
| 12.01 | 1266 | 705 |
| 15.07 | 1111 | 616 |
| 18.04 | 998 | 564 |

The capillary viscosity (units of Pa-seconds) of Comparative Examples P and T at different shear rates (units of reciprocal seconds) was also measured by a capillary rheometer at 190° C. The capillary viscosity results are presented in Table 22.

TABLE 22

| Shear Rate | Comp. Ex. P | Comp. Ex. T |
|---|---|---|
| 99.9936 | 1099.24 | 978.099 |
| 149.99 | 887.534 | 496.804 |
| 249.984 | 669.315 | 326.694 |
| 399.974 | 509.925 | 247.333 |
| 630.029 | 377.035 | 188.053 |
| 1000.05 | 280.274 | 141.652 |
| 1500.02 | 216.167 | 105.931 |
| 2499.96 | 153.154 | 78.5195 |
| 3999.97 | 108.086 | 56.4835 |

Examples 26-35

Examples 26-35 were inventive polymer compositions prepared by melt blending the respective list of ingredients as shown in Table 23 below. The melt blending of the formulations was performed using a Coperion ZSK25 corotating twin screw extruder equipped with a medium shear screw stack.

TABLE 23

|  | Ex. 33 | Comp. Ex. T |
|---|---|---|
| OBC, 0.5 MI | 46.9 |  |
| PP-2 | 15.6 |  |
| MB50-002 | 0.5 |  |
| $CaCO_3$ | 20 |  |

TABLE 23-continued

|  | Ex. 33 | Comp. Ex. T |
| --- | --- | --- |
| Oil | 15 |  |
| Americhem gray concentrate | 2 |  |

Note:
OBC is Polymer Example 19k above which is an ethylene/α-olefin interpolymer having a density of 0.877 g/cc and a melt index of 0.5 prepared according to the general preparation procedure for Polymer Examples 19k above; LDPE is a low density polyethylene 662I having a melt index of 0.47 g/10 min (ASTM D1238), a density of 0.919 g/cc (ASTM D 792) available from The Dow Chemical Company, Midland, MI; MB50-002 is a pelletized formulation containing 50% of an ultra-high molecular weight siloxane polymer dispersed in polyethylene (LDPE) homopolymer from Dow Corning Corporation, Midland, MI; Americhem gray concentrate is a colorant from Americhem, Cuyahoga Falls, OH.
Example 33 shows 4.4% gloss (60 degree), while comparative Example T shows 30% gloss, thus lowering (i.e., improving) the gloss of the formulations of the invention.

Examples 26-34 were tested for Tm and Tcrystalf as determined by differential scanning calorimetry (DSC) as well as melt flow rates $I_2$ and $I_{10}$, density, Shore A hardness, tensile strength in machine direction, elongation at break, Die C tear strength in machine direction, compression set, 60° gloss and shear thinning index. The test results are presented in Table 24 and Table 25.

TABLE 24

|  | Ex. 33 | Comp. Ex. T |
| --- | --- | --- |
| DSC Tm (° C.) | 119/153 |  |
| DSC T crystaf (° C.) | 107/122 |  |
| $I_2$ at 190° C. | 2.24 |  |
| $I_{10}$ at 190° C. | 29.34 |  |
| Density (g/cc) | 1.01 |  |
| Shore A | 73 |  |
| Tensile (MD, N/mm²) | 9.33 |  |
| Elongation at break (%) | 925 |  |
| Die C tear (MD, N/mm) | 45.7 |  |
| Compression set, % (22 hrs at 70° C.) | 57.31 |  |
| Compression set, % (22 hrs at 23° C.) | 33.18 |  |
| 60° Gloss (%) | 4.4 |  |

Example 29 and Comparative Example P were also tested for 60° sheet gloss and 60° sheet gloss after thermoformed at temperatures of 160° C., 170° C., 180° C., and 190° C. The test results are presented in Table 25.

TABLE 25

|  |  | Ex. 29 | Comp. Ex. P |
| --- | --- | --- | --- |
| 60° sheet gloss |  | 16.7 | 68.6 |
| 60° sheet gloss after thermoformed at different temperatures | 160° C. | 3.8 | 10.9 |
|  | 170° C. | 3.9 | 9.5 |
|  | 180° C. | 3.4 | 14.2 |
|  | 190° C. | 5 | 11.6 |
|  | 220° C. | 4.4 | 16 |

Figure 12:
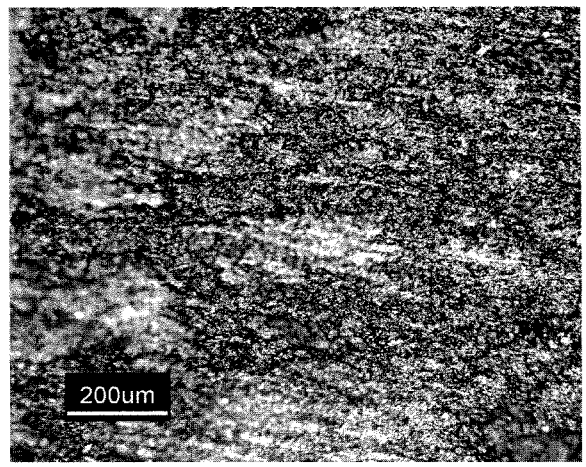
FIG. 12 shows the optical micrograph of the surface of the extruded profile of a Comparative Example of Santoprene taken under reflected Nomarski interference contrast at 150× magnification.
Figure 13:
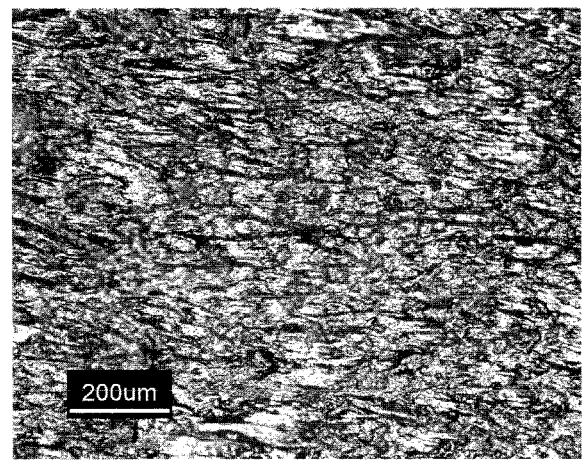
FIG. 13 shows the optical micrograph of the surface of the extruded profile of Example 32 taken under reflected Nomarski interference contrast at 150× magnification.
Figure 14:
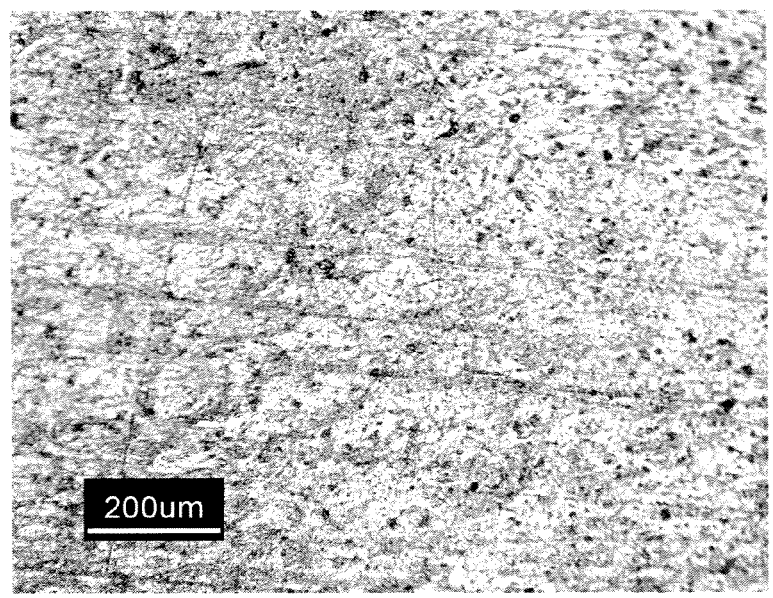
FIG. 14 shows the optical micrograph of the surface of the extruded profile of Comparative Example T taken under reflected Nomarski interference contrast at 150× magnification.

Extrusion profiles were made from the compositions of a comparative example of Santoprene, Example 32, and Comparative Example T. Reflected Nomarski images of the exterior surfaces of the extruded profiles are shown in FIGS. 12-14 respectively. The images were obtained in a similar manner to that of Example 21 and Comparative Example M described above. The micrographs show that the extrusion profile of Example 32 has larger scale sized surface patterns (and therefore lower gloss) in comparison to Comparative Example T.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A crosslink-free thermoformed article comprising:
a sheet composed of a polymer composition comprising components (i)-(iii):
(i) at least one ethylene/α-olefin interpolymer, wherein the ethylene/α-olefin interpolymer is a block interpolymer and is characterized by
(a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq -2002.9 + 4538.5(d) - 2422.2(d)^2; \text{ or}$$

(ii) from 20 wt % to 75 wt % of a polypropylene having a tan delta value at 0.1 radians per second of less than 2.5;
(iii) from 0.1 wt % to 1.0 wt % of an ultra-high molecular weight polydialkylsiloxane having a $C_{1-4}$ alkyl group; and
the thermoformed article is crosslink-free and has a thermoformed surface having a 60° gloss less than 9.0%.

2. The article of claim 1, wherein the ethylene/α-olefin interpolymer has a Mw/Mn from about 1.7 to about 3.5, at least one melting point, Tm, in degrees Celsius, and a density, d, in grams/cubic centimeter, wherein the numerical values of Tm and d correspond to the relationship: $T_m \geq 858.91 - 1825.3(d) + 1112.8(d)^2$.

3. The article of claim 1 wherein the α-olefin in the ethylene/α-olefin interpolymer is styrene, propylene, 1-butene, 1-hexene, 1-octene, 4-methyl-1-pentene, norbornene, 1-decene, 1,5-hexadiene or a combination thereof.

4. The article of claim 1 comprising from 70 wt % to 75 wt % of the ethylene/α-olefin interpolymer.

5. The article of claim 1 further comprising at least one additive composition, wherein the additive composition is selected from the group consisting of a colorant or pigment, a scratch or mar resistance agent, a plasticizer, an oil, an antioxidant, a UV stabilizer, a filler, a lubricant, an antifogging agent, a flow aid, a coupling agent, a cross-linking agent, a nucleating agent, a surfactant, a solvent, a flame retardant, an antistatic agent, an antimicrobial, or a combination thereof.

6. The article of claim 1 wherein ethylene/α-olefin interpolymer comprises hard segments and soft segments; and
the thermoformed surface comprises a lamellar structure of chain folded hard segment domains.

7. The article of claim 2, wherein the ethylene/α-olefin interpolymer has a heat of fusion of 48 J/g.

8. The article of claim 7, wherein the ethylene/α-olefin interpolymer has a crystallization temperature of 99° C.

9. The article of claim 8, wherein the ethylene/α-olefin interpolymer has a Tm-TCRYSTAF (° C.) of 31.

10. The article of claim 1 wherein the polypropylene has a tan delta value at 0.1 radians per second of less than 1.5.

11. The article of claim 1 wherein the polypropylene is a polypropylene having a melt strength of at least about 5cN at 100 mm/s.

12. The article of claim 1 wherein the polypropylene of the polymer composition comprises a branched polypropylene having a tan delta value at 0.1 radians per second of less than 2.5.

13. The article of claim 1 wherein the polypropylene of the polymer composition has a melt flow rate of at least about 0.5 g/10 minutes measured with a 2.16 Kg load at 230° C. according to ASTM D 1238.

14. The article of claim 1 wherein after subjecting the article to ASTM D7027-05 at a load equal to or less than 20 N and a scratch speed of 50 mm/s, the article exhibits no substantial scratch whitening on its surface.

15. The article of claim 1 wherein the sheet is thermoformed at a temperature of 220° C. and the thermoformed surface has a 60° gloss less than or equal to 5.0%.

16. The article of claim 1 wherein the sheet is thermoformed at a temperature from 160° C. to 220° C. and the thermoformed surface has a 60° gloss from 3.4% to less than or equal to 5.0%.

17. The article of claim 1 wherein the sheet has a thickness from 0.01 inches to 1.0 inch.

18. The article of claim 6 wherein the lamellar structure produces a surface roughness on the thermoformed surface and provides the thermoformed surface with a 60° gloss less than or equal to 5.0% when thermoformed at any temperature from 160° C. to 220° C.

19. The article of claim 1 wherein the article is a part suitable for the interior or exterior of an automotive vehicle.

* * * * *